(12) United States Patent
Yamanaka et al.

(10) Patent No.: US 9,751,283 B2
(45) Date of Patent: Sep. 5, 2017

(54) RESIN-COATED METAL SHEET FOR CONTAINERS

(71) Applicant: JFE STEEL CORPORATION, Tokyo (JP)

(72) Inventors: Yoichiro Yamanaka, Tokyo (JP); Koichi Sasaki, Tokyo (JP); Yusuke Nakagawa, Tokyo (JP); Junichi Kitagawa, Tokyo (JP); Yoichi Tobiyama, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 515 days.

(21) Appl. No.: 14/346,194

(22) PCT Filed: Sep. 27, 2012

(86) PCT No.: PCT/JP2012/006181
§ 371 (c)(1),
(2) Date: Mar. 20, 2014

(87) PCT Pub. No.: WO2013/046687
PCT Pub. Date: Apr. 4, 2013

(65) Prior Publication Data
US 2014/0227529 A1    Aug. 14, 2014

(30) Foreign Application Priority Data
Sep. 28, 2011  (JP) .................. 2011-212459

(51) Int. Cl.
*B32B 15/09*   (2006.01)
*B32B 15/092*  (2006.01)
(Continued)

(52) U.S. Cl.
CPC .............. *B32B 15/09* (2013.01); *B32B 15/08* (2013.01); *B32B 15/092* (2013.01);
(Continued)

(58) Field of Classification Search
CPC ..... Y10T 428/31681; Y10T 428/31522; Y10T 428/31529; C08J 2367/02; C08J 2367/04;
(Continued)

(56) References Cited

U.S. PATENT DOCUMENTS

2010/0243506 A1*  9/2010  Cleaver .................. B65D 25/14
                                                            206/524.6

FOREIGN PATENT DOCUMENTS

| EP | 2431171 | 3/2012 |
|----|---------|--------|
| JP | 04-266984 | 9/1992 |

(Continued)

OTHER PUBLICATIONS

International Search Report dated Jan. 8, 2013, application No. PCT/JP2012/006181.

*Primary Examiner* — Ling Choi
*Assistant Examiner* — David L Miller
(74) *Attorney, Agent, or Firm* — RatnerPrestia

(57) ABSTRACT

The resin-coated metal sheet for containers includes a resin coating layer (A) having a multilayered structure mainly composed of a polyester resin on at least one surface thereof. The resin coating layer (A) includes a resin layer (a1). The resin layer (a1) adheres to the metal sheet, contains (i) a polyester resin, (ii) a phenolic resin, (iii) a metal alkoxide compound and/or a metal chelate compound, (iv) an epoxy resin, and (v) at least one selected from the group consisting of polyamine resins, polyamidoamine resins, and polyamide resins, and is mainly composed of the polyester resin. Preferably, a polyester film (a2) is disposed on the resin layer (a1).

8 Claims, 3 Drawing Sheets

(51) Int. Cl.
| | |
|---|---|
| B32B 15/088 | (2006.01) |
| B32B 15/098 | (2006.01) |
| B32B 15/08 | (2006.01) |
| B32B 27/36 | (2006.01) |
| B65D 6/00 | (2006.01) |
| B32B 15/18 | (2006.01) |
| B32B 27/08 | (2006.01) |
| B32B 27/20 | (2006.01) |
| C08J 7/04 | (2006.01) |
| C09D 167/07 | (2006.01) |
| C09D 167/03 | (2006.01) |
| C09D 167/06 | (2006.01) |
| B32B 1/02 | (2006.01) |
| B32B 27/38 | (2006.01) |
| C09D 167/02 | (2006.01) |
| C09D 167/08 | (2006.01) |
| B32B 27/42 | (2006.01) |
| C09D 167/04 | (2006.01) |
| C09D 167/00 | (2006.01) |
| B32B 9/04 | (2006.01) |
| C09D 163/10 | (2006.01) |
| C09D 161/04 | (2006.01) |
| C09D 161/12 | (2006.01) |
| C09D 163/08 | (2006.01) |
| C09D 161/06 | (2006.01) |
| C09D 161/16 | (2006.01) |
| C09D 161/14 | (2006.01) |
| C09D 163/00 | (2006.01) |
| C09D 163/04 | (2006.01) |
| C09D 163/06 | (2006.01) |

(52) U.S. Cl.
CPC ............ *B32B 15/098* (2013.01); *B32B 15/18* (2013.01); *B32B 27/08* (2013.01); *B32B 27/20* (2013.01); *B32B 27/36* (2013.01); *B65D 7/42* (2013.01); *C08J 7/047* (2013.01); *C09D 167/02* (2013.01); *B32B 1/02* (2013.01); *B32B 9/041* (2013.01); *B32B 27/38* (2013.01); *B32B 27/42* (2013.01); *B32B 2250/03* (2013.01); *B32B 2255/06* (2013.01); *B32B 2255/205* (2013.01); *B32B 2264/00* (2013.01); *B32B 2264/102* (2013.01); *B32B 2264/104* (2013.01); *B32B 2270/00* (2013.01); *B32B 2307/306* (2013.01); *B32B 2307/518* (2013.01); *B32B 2307/558* (2013.01); *B32B 2307/702* (2013.01); *B32B 2307/714* (2013.01); *B32B 2363/00* (2013.01); *B32B 2367/00* (2013.01); *B32B 2439/66* (2013.01); *B32B 2439/70* (2013.01); *C08J 2367/02* (2013.01); *C08J 2367/04* (2013.01); *C08J 2367/06* (2013.01); *C08J 2367/07* (2013.01); *C08J 2367/08* (2013.01); *C08J 2461/04* (2013.01); *C08J 2461/06* (2013.01); *C08J 2461/08* (2013.01); *C08J 2461/10* (2013.01); *C08J 2461/12* (2013.01); *C08J 2461/14* (2013.01); *C08J 2463/00* (2013.01); *C08J 2463/02* (2013.01); *C08J 2463/04* (2013.01); *C08J 2463/06* (2013.01); *C08J 2463/08* (2013.01); *C08J 2463/10* (2013.01); *C08J 2467/02* (2013.01); *C08J 2467/03* (2013.01); *C08J 2467/04* (2013.01); *C08J 2467/06* (2013.01); *C08J 2467/07* (2013.01); *C08J 2467/08* (2013.01); *C08J 2477/00* (2013.01); *C08J 2479/02* (2013.01); *C09D 161/04* (2013.01); *C09D 161/06* (2013.01); *C09D 161/12* (2013.01); *C09D 161/14* (2013.01); *C09D 161/16* (2013.01); *C09D 163/00* (2013.01); *C09D 163/04* (2013.01); *C09D 163/06* (2013.01); *C09D 163/08* (2013.01); *C09D 163/10* (2013.01); *C09D 167/00* (2013.01); *C09D 167/025* (2013.01); *C09D 167/03* (2013.01); *C09D 167/04* (2013.01); *C09D 167/06* (2013.01); *C09D 167/07* (2013.01); *C09D 167/08* (2013.01); *Y10T 428/31522* (2015.04); *Y10T 428/31529* (2015.04); *Y10T 428/31681* (2015.04)

(58) Field of Classification Search
CPC ................ C08J 2367/06; C08J 2367/07; C08J 2367/08; C08J 2467/02; C08J 2467/04; C08J 2467/03; C08J 2467/06; C08J 2467/07; C08J 2467/08; C08J 2463/00–2463/10; C08J 2461/04–2461/14; C09D 167/00; C09D 167/02; C09D 167/03; C09D 167/025; C09D 167/04; C09D 167/06; C09D 167/07; C09D 167/08; C09D 163/00–163/10; C09D 161/04–161/16; B32B 1/02; B32B 9/041; B32B 27/36; B32B 27/38; B32B 27/42; B32B 2367/00; B32B 2363/00; B32B 15/09; B32B 15/092; B32B 15/098; B32B 15/08
See application file for complete search history.

(56) References Cited

FOREIGN PATENT DOCUMENTS

| | | |
|---|---|---|
| JP | 08-199147 | 8/1996 |
| JP | 10-183095 | 7/1998 |
| JP | 2002-206079 | 7/2002 |
| JP | 2007-185915 A | 7/2007 |
| JP | 2008018713 | 1/2008 |
| JP | 2009-78540 A | 4/2009 |
| JP | 2010-235188 A | 10/2010 |
| JP | 2012-25132 A | 2/2012 |
| JP | 2012025132 A * | 2/2012 |
| JP | 2013071327 | 4/2013 |
| JP | 2013071329 | 4/2013 |

* cited by examiner

RESIN-COATED METAL SHEET FOR CONTAINERS

CROSS REFERENCE TO RELATED APPLICATIONS

This is the U.S. National Phase application of PCT International Application No. PCT/JP2012/006181, filed Sep. 27, 2012, and claims priority to Japanese Patent Application No. 2011-212459, filed Sep. 28, 2011, the disclosures of each of these applications being incorporated herein by reference in their entireties for all purposes.

FIELD OF THE INVENTION

The present invention relates to a resin-coated metal sheet for containers, for example, for use in can bodies and lids of food cans.

BACKGROUND OF THE INVENTION

Metal sheets, such as tin-free steels (TFS) and aluminum sheets, that are used as materials for metal cans for use as food cans are coated in order to improve corrosion resistance, durability, and weather resistance. However, applying a coating has problems of complicated baking, a long treating time, and emission of large amounts of solvents.

In order to solve these problems, instead of coated steel sheets, film-laminated metal sheets, which are manufactured by laminating a thermoplastic resin film on a heated metal sheet, have been developed and are industrially used as materials for food cans.

In addition to baseline characteristics, such as processability and adhesiveness, materials for food cans, for example, two-piece cans require various capabilities, such as deep drawability, adhesiveness after processing and retort treatment, corrosion resistance, and ease of design.

The functionality of film-laminated metal sheets may be expanded by (1) a method of expanding the functionality of the film itself by adding a modifier having a desired function to the film or (2) a method of applying a modifier having a desired function or a resin containing the modifier to the film without modifying the film itself.

The method (1) of directly adding the modifier to the film has high production efficiency and profitability when the film having a certain function is manufactured in large quantities. However, since the shape and contents of food cans vary widely, and the function required for food cans varies with the type of food can, this method is not appropriate. This is because a change in function to be provided to a film requires washing of a resin extruder, a casting drum, and a chill roll and a shutdown of the production line for a long time, which significantly decreases production efficiency. On the other hand, with the method (2) of applying a resin containing a modifier to the film, it is easy to change the function to be provided to the film. Thus, the method (2) can satisfy various demands of food cans. This is because a tank of a coating liquid containing a modifier can be washed and changed in a short time.

A method of applying a resin containing a modifier to a film is described in Patent Literature 1, for example. In Patent Literature 1, a resin layer containing an epoxy resin as a main component and containing a melamine resin, a blocked isocyanate compound, and a colorant is formed between a metal sheet and a film.

Although epoxy resins are reactive and have good adhesion to metal sheets, epoxy resins have poor deep drawability. Thus, epoxy resins cannot be used to manufacture films that can be used as materials for two-piece cans. When a resin-coated metal sheet described in Patent Literature 1 is formed into a draw and redraw can (DRD can), the epoxy resin cannot follow the elongational deformation in the height direction and restricts the deformation of the material. As a result, the material breaks in the drawing process.

Patent Literatures 2 to 5 disclose a method of applying a resin to a film in order to improve adhesion. Patent Literatures 2 to 5 describe a composite system of a polyester resin and an epoxy resin or a structure mainly composed of an epoxy resin. Thus, as Patent Literature 1, Patent Literatures 2 to 5 cannot be applied to two-piece cans because of poor deep drawability. Furthermore, examples described in Patent Literatures 2 to 5 did not describe can processability or deep drawability. Thus, it is clear that Patent Literatures 2 to 5 do not consider two-piece cans requiring deep drawing.

PATENT LITERATURE

PTL 1: Japanese Unexamined Patent Application Publication No. 2007-185915
PTL 2: Japanese Unexamined Patent Application Publication No. 4-266984
PTL 3: Japanese Unexamined Patent Application Publication No. 8-199147
PTL 4: Japanese Unexamined Patent Application Publication No. 10-183095
PTL 5: Japanese Unexamined Patent Application Publication No. 2002-206079

SUMMARY OF THE INVENTION

In view of such situations, the present invention aims to provide a resin-coated metal sheet for containers that can satisfy various characteristics required for food can materials.

As a result of extensive studies to solve the problems, the present inventors obtained the following findings. A resin-coated metal sheet for containers according to one aspect of the present invention includes a resin coating layer having a multilayered structure mainly composed of a polyester resin on at least one surface thereof. The resin-coated metal sheet for containers includes a resin layer as an adhesion layer on the metal sheet. The resin layer contains (i) the polyester resin, (ii) a phenolic resin, (iii) a metal alkoxide compound and/or a metal chelate compound, (iv) an epoxy resin, and (v) at least one selected from the group consisting of polyamine resins, polyamidoamine resins, and polyamide resins. Preferably, the resin-coated metal sheet for containers includes a polyester film on the resin layer. The resin-coated metal sheet for containers has excellent baseline characteristics, such as deep drawability and adhesiveness after processing, and excellent functions, such as ease of design in a retort treatment environment.

The present invention was achieved on the basis of these findings and includes:

[1] A resin-coated metal sheet for containers, including a resin coating layer (A) having a multilayered structure mainly composed of a polyester resin on at least one surface thereof, the resin coating layer (A) including a resin layer (a1) that adheres to the metal sheet, contains the following components (i) to (v), and is mainly composed of a polyester resin:

(i) the polyester resin,
(ii) a phenolic resin, (iii) a metal alkoxide compound and/or a metal chelate compound, (iv) an epoxy resin, and (v) at least one selected from the group consisting of polyamine resins, polyamidoamine resins, and polyamide resins.

[2] The resin-coated metal sheet for containers according to [1], wherein the (iv) epoxy resin is an epoxy resin other than bisphenol A.

[3] The resin-coated metal sheet for containers according to [1] or [2], wherein the resin coating layer (A) includes the resin layer (a1) and a polyester film (a2) disposed on the resin layer (a1).

[4] The resin-coated metal sheet for containers according to any one of [1] to [3], wherein the resin component ratio of the resin layer (a1) is as follows:

(i) the polyester resin: 50 to 89 mass %, (ii) the phenolic resin: 10 to 45 mass %, (iii) the metal alkoxide compound and/or the metal chelate compound: 0.01 to 10 mass %, (iv) the epoxy resin: 0.5 to 20 mass %, and (v) at least one selected from the group consisting of polyamine resins, polyamidoamine resins, and polyamide resins: 0.1 to 10 mass %.

[5] The resin-coated metal sheet for containers according to any one of [1] to [4], wherein the (i) polyester resin has a number-average molecular weight in the range of 3000 to 100000 and is at least one of the following (i-1) to (i-3):

(i-1) a polyester resin having a glass transition temperature of 0° C. or more and less than 35° C., (i-2) a polyester resin having a glass transition temperature of 35° C. or more and less than 65° C., and (i-3) a polyester resin having a glass transition temperature of 65° C. or more and less than 100° C.

[6] The resin-coated metal sheet for containers according to [5], wherein the polyester resin ratio of the (i) polyester resin is as follows:

the polyester resin having a glass transition temperature of 0° C. or more and less than 35° C.: 30 to 70 mass %, the polyester resin having a glass transition temperature of 35° C. or more and less than 65° C.: 10 to 35 mass %, and the polyester resin having a glass transition temperature of 65° C. or more and less than 100° C.: 10 to 35 mass %.

[7] The resin-coated metal sheet for containers according to any one of [1] to [6], wherein the (i) polyester resin is a polyester resin having a repeating unit derived from diphenolic acid.

[8] The resin-coated metal sheet for containers according to any one of [1] to [7], wherein the (iii) metal alkoxide compound and/or metal chelate compound is a titanium alkoxide compound and/or a titanium chelate compound.

[9] The resin-coated metal sheet for containers according to any one of [2] to [8], wherein the polyester film (a2) is a biaxially stretched polyester film in which 85 mass % or more of the constitutional units of the polyester resin is an ethylene terephthalate unit and/or an ethylene naphthalate unit, and the biaxially stretched polyester film contains inorganic particles and/or organic particles.

The present invention can provide a resin-coated metal sheet for containers that can satisfy various characteristics required for materials for food cans. The present invention is an industrially useful invention as a novel resin-coated metal sheet for containers for which various functions required for food cans can be easily provided.

EXAMPLE 1

DETAILED DESCRIPTION OF EMBODIMENTS OF THE INVENTION

Figure 1:
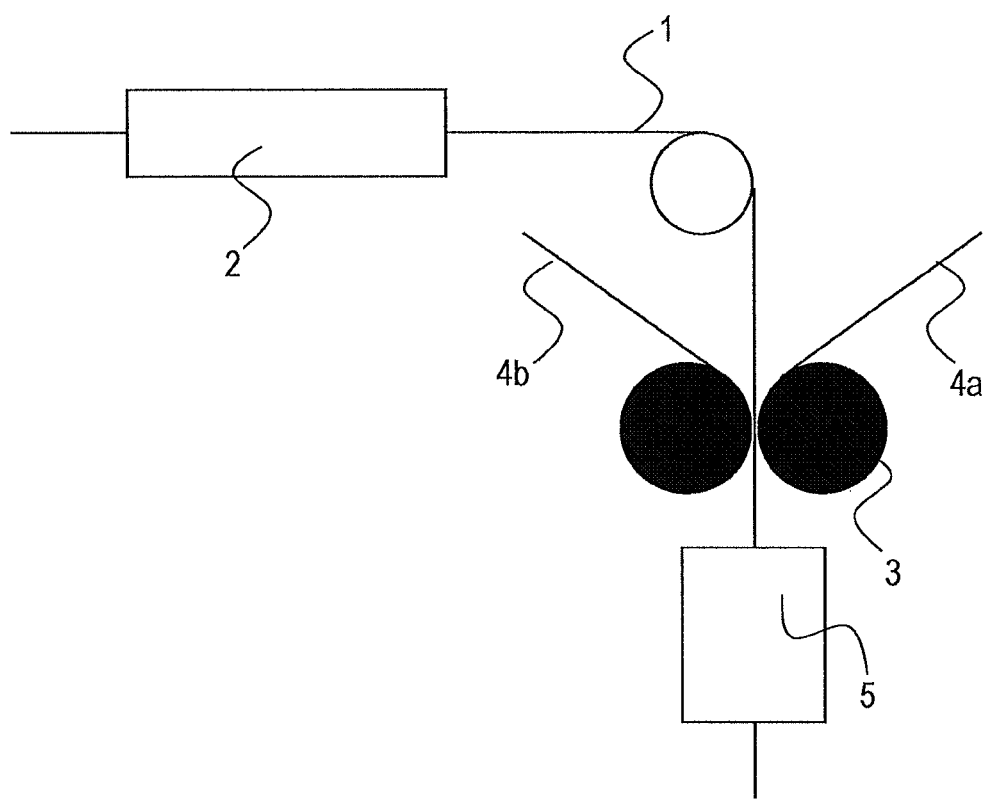
FIG. 1 is a schematic view of a principal part of a laminator for metal sheets. (Example 1)

A resin-coated metal sheet for containers according to embodiments of the present invention will be described in detail below.

A metal sheet that can be used in the present invention will be described below.

A metal sheet used in the present invention may be an aluminum sheet or a mild steel sheet widely used as a can material. In particular, a surface-treated steel sheet (hereinafter referred to as TFS) that has a two-layer film including a metallic chromium lower layer and a chromium hydroxide upper layer may be most suitable.

The amounts of adhered metallic chromium layer and chromium hydroxide layer of TFS are not particularly limited. It is desirable in terms of adhesiveness after processing and corrosion resistance that the amounts of adhered metallic chromium layer and chromium hydroxide layer range from 70 to 200 mg/m$^2$ and 10 to 30 mg/m$^2$ on a Cr basis, respectively.

A resin-coated metal sheet for containers according to the present invention preferably includes a resin coating layer (A) having a multilayered structure mainly composed of a polyester resin on at least one surface thereof. The polyester resin may be the same as a polyester resin of a resin layer (a1) described below.

The resin coating layer (A) includes a resin layer (a1) adhering to the metal sheet. The resin layer (a1) contains a polyester resin as a main component and contains the following components (i) to (v). While the resin coating layer (A) contains the polyester resin as a main component as described above, the term "main component", as used herein, means that the polyester resin constitutes 50 mass % or more of the resin coating layer (A).

(i) Polyester resin (ii) Phenolic resin (iii) Metal alkoxide compound and/or a metal chelate compound (iv) Epoxy resin (v) At least one selected from the group consisting of polyamine resins, polyamidoamine resins, and polyamide resins The resin layer (a1) adhering to the metal sheet will be described below.

(i) Polyester Resin

The polyester resin is the main component. The term "main component", as used herein, means that the polyester resin constitutes 50 mass % or more of the resin layer (a1). The polyester resin preferably has a number-average molecular weight in the range of 3000 to 100000, more preferably 5000 to 30000, still more preferably 10000 to 25000. The number-average molecular weight is the polystyrene equivalent molecular weight as measured by gel permeation chromatography. A number-average molecular weight of less than 3000 may result in poor processability.

A number-average molecular weight of more than 100000 may result in a high viscosity of paint produced therefrom and inappropriate coating.

The polyester resin preferably has a glass transition temperature of 0° C. or more and less than 100° C. A glass transition temperature of 0° C. or more and less than 100° C. results in a good balance between flexibility, processability, and blocking resistance of the resin suitable for food can applications.

It may be difficult to satisfy various performance requirements with a single polyester resin. When a polyester resin having a glass transition temperature of 0° C. or more and less than 35° C. is used alone, the resin layer has good processability because of its high flexibility. When a roll of a film coated with the resin layer is stored at a temperature above the glass transition temperature for a long time, however, the film may cause blocking. Furthermore, because of its low glass transition temperature and heat resistance, the polyester resin has slightly poor retort resistance.

When the glass transition temperature is 35° C. or more and less than 65° C., the film does not cause blocking and is not aesthetically damaged. When the glass transition temperature is 65° C. or more and less than 100° C., the film becomes rigid and has slightly poor processability, although the film has high blocking resistance.

Thus, the polyester resin is preferably a combination of resins having different glass transition temperatures. A balanced resin layer having better performance can be realized by exploiting the high performance of each of the polyester resins.

For combined use of resins having different glass transition temperatures, the polyester resin ratio is preferably as follows:

a polyester resin having a glass transition temperature of 0° C. or more and less than 35° C.: 30 to 80 mass %, a polyester resin having a glass transition temperature of 35° C. or more and less than 65° C.: 10 to 35 mass %, and a polyester resin having a glass transition temperature of 65° C. or more and less than 100° C.: 10 to 35 mass %.

Such a polyester resin ratio results in a significantly improved balance between processability and blocking resistance.

The polyester resin preferably has a repeating unit derived from diphenolic acid. When the monomer composition of raw material components for use in the manufacture of the polyester resin contains diphenolic acid, this results in high reactivity with phenolic resins and an increased curing rate, resulting in improved retort whitening resistance. Curing is also improved by using a high percentage of a polyester having a glass transition temperature of 0° C. or more and less than 35° C. produced using diphenolic acid as an essential monomer. Thus, the polyester resin preferably has a repeating unit derived from diphenolic acid because the resulting coating film has high blocking resistance in spite of its low glass transition temperature.

The polyester resin (i) may be produced by an esterification reaction between a polybasic acid component and a polyhydric alcohol component.

For example, the polybasic acid component is one or more dibasic acids, such as phthalic anhydride, isophthalic acid, terephthalic acid, succinic acid, fumaric acid, adipic acid, azelaic acid, sebacic acid, and/or a dimer acid, and/or a lower alkyl ester of these acids. If necessary, a monobasic acid, such as benzoic acid or crotonic acid, and/or a trivalent or higher valent polybasic acid, such as trimellitic anhydride or methylcyclohexene tricarboxylic acid, may also be used.

The polyhydric alcohol component may be mainly a dihydric alcohol, such as ethylene glycol, diethylene glycol, propylene glycol, 1,4-butanediol, neopentyl glycol, 3-methylpentanediol, 1,4-hexanediol, 1,6-hexanediol, or cyclohexanedimethanol. If necessary, a trivalent or higher valent polyhydric alcohol, such as glycerin, trimethylolethane, trimethylolpropane, or pentaerythritol may also be used. These polyhydric alcohols may be used alone or in combination.

Examples of commercial products of the polyester resin (i) include Vylon 300, 500, 560, 600, 630, 650, and 670 and Vylon GK130, 140, 150, 190, 330, 590, 680, 780, 810, and 890 manufactured by Toyobo Co., Ltd., Elitel UE-3220, 3500, 3210, 3215, 3216, 3620, 3240, 3250, and 3300 manufactured by Unitika Ltd., and Aron Melt PES-310, 318, and 334 manufactured by Toagosei Co., Ltd.

(ii) Phenolic Resin

The addition of a phenolic resin causes a cross-linking reaction and the formation of a three-dimensional network structure, thereby improving the corrosion resistance and retort resistance of the film.

A phenolic resin is added to the resin layer (a1) as the component (ii). A phenolic resin may be synthesized from a trifunctional phenol compound, such as phenol, m-cresol, m-ethylphenol, 3,5-xylenol, or m-methoxyphenol, or a bifunctional phenol, such as p-cresol, o-cresol, p-tert-butylphenol, p-ethylphenol, 2,3-xylenol, 2,5-xylenol, or m-methoxyphenol, and formaldehyde in the presence of an alkaline catalyst. These phenol compounds may be used alone or in combination. Part or all of the methylol groups of the phenolic resin may be etherified with an alcohol having 1 to 12 carbon atoms.

(Iii) Metal Alkoxide Compound and/or Metal Chelate Compound

A metal alkoxide compound and/or a metal chelate compound reacts with the (i) polyester resin, (ii) phenolic resin, or (iv) epoxy resin. A cross-linking reaction occurs between a functional group of each of these resins and a metal alkoxide compound and/or a metal chelate compound. Because of a much higher curing rate of the film than the curing rate in the absence of the metal alkoxide compound and/or the metal chelate compound, the cross-linking reaction can realize good adhesion, high processability, high retort resistance, and high corrosion resistance using a very small amount of thermal energy. For example, in the case of existing laminate cans, a laminated film is baked at 180° C. or more for several seconds to a few minutes, and the resin film is then cured by post-heating to satisfy the various performance requirements. In the present invention, however, a resin layer containing a metal alkoxide compound and/or a metal chelate compound can be sufficiently cured by heating for a short period of time, such as one second, in heat seal lamination and has performance equal to or higher than the performance of a post-heated resin layer. This obviates the need for the post-heating process in the manufacturing process and remarkably improves manufacturing efficiency. This also reduces carbon dioxide emission. Thus, the technique is very useful from a practical standpoint. Furthermore, the metal in the film improves the film strength and consequently significantly improves impact resistance and corrosion resistance. For these reasons, the resin layer (a1) contains a metal alkoxide compound and/or a metal chelate compound.

Examples of the metal alkoxide compound and/or the metal chelate compound include alkoxide metal compounds of aluminum, titanium, tin, and zirconium and metal chelate compounds in which acetoacetic acid coordinates to a metal.

Among these, titanium alkoxide compounds and/or titanium chelate compounds are preferred. The reason for that will be described below.

A continuous cross-linking reaction between the metal alkoxide compound and/or the metal chelate compound and the polyester resin and/or the phenolic resin forms a three-dimensional network of molecular chains in the resin layer. This can most effectively reduce discoloration due to permeation of water vapor or hot water in a retort treatment environment.

Discoloration due to water vapor is a phenomenon in which the resin layer becomes cloudy during retort sterilization treatment and is referred to as retort whitening. Discoloration damages the design of a can outer surface and is a great problem that reduces consumer demand. As a result of extensive studies, the present inventors found that water vapor permeating into a resin layer covering a can body forms liquid bubbles at the interface between the resin layer and the can body and in the vicinity of the interface, and the liquid bubbles scatter light. Thus, in order to improve characteristics, it is important to reduce the formation of liquid bubbles at the interface between the resin layer and the can body and in the vicinity of the interface. Water vapor entering the resin diffuses in the resin and reaches the interface between the resin layer and the metal sheet. Immediately after the start of retort treatment, the contents of a can have normal temperature, and there is a temperature gradient from the outside to the inside of the can. As water vapor diffusing in the resin approaches the metal sheet, the water vapor is cooled and liquefied at the interface between the resin layer and the metal sheet and in the vicinity of the interface, and the condensed water forms liquid bubbles. Liquid bubbles remaining at the interface and in the vicinity of the interface after the retort treatment scatter light and make the resin surface cloudy. Thus, retort whitening can be prevented by suppressing the formation of liquid bubbles at the interface and in the vicinity of the interface.

In addition to retort treatment apparatuses that use water vapor as a heating medium as described above, there are also retort treatment apparatuses that use hot water as a heating medium. In retort treatment apparatuses that use hot water as a heating medium, the resin layer changes color through a mechanism different from the mechanism of discoloration due to water vapor and suffers degradation in design. It is believed that the reason for this is that when the cross-linking reaction of polyester molecular chains proceeds insufficiently at an early stage of retort treatment water permeating into the resin layer promotes the hydrolysis reaction of the polyester molecular chains while the carbonyl end group of the polyester acts as a catalyst, thereby forming large liquid bubbles in the resin layer.

As a result of extensive studies on the two discoloration phenomena described above, the present inventors found that when a titanium alkoxide compound and/or a titanium chelate compound is used as the metal alkoxide compound and/or the metal chelate compound a polyester molecular chain network formed through a cross-linking reaction between the titanium alkoxide compound and/or the titanium chelate compound and the polyester resin and/or the phenolic resin can be sufficiently formed in the heat seal lamination step, and this can most effectively reduce the occurrence of these discoloration phenomena. It is believed that the polyester molecular chain network prevents water vapor and hot water from permeating into the resin and reaching the interface, and an increase in the strength and elastic modulus of the resin can retard the formation and growth of liquid bubbles. A decrease in the number of carbonyl end groups associated with the formation of the molecular chain network reduces the occurrence of a rapid hydrolysis reaction. Thus, the metal alkoxide compound and/or the metal chelate compound is preferably a titanium alkoxide compound and/or a titanium chelate compound.

(iv) Epoxy Resin

The epoxy resin principally improves the adhesion of the film. In particular, the epoxy resin is preferably a novolak epoxy resin. Examples of commercial products of novolak epoxy resins include Epiclon N-665, 670, 673, 680, 690, 695, 730, 740, 770, 865, and 870 manufactured by DIC Corp., XD-7855 manufactured by the Dow Chemical Company, and ECN-1273 and 1299 manufactured by Asahi Kasei Epoxy Co., Ltd. Examples of biphenyl epoxy resins include YL6121H and YX7399 manufactured by Mitsubishi Chemical Corp.

Preferably, the epoxy resin is not bisphenol A. This is because bisphenol A may be an endocrine disruptor.

(v) At Least One Selected from the Group Consisting of Polyamine Resins, Polyamidoamine Resins, and Polyamide Resins Polyamine resins, polyamidoamine resins, and polyamide resins are superior in curing rate and ability to form strong films to melamine resins.

Polyamine resins, polyamidoamine resins, and polyamide resins are superior in curing characteristics to polyester/melamine or epoxy/melamine resin compositions and can exhibit particularly high retort resistance, corrosion resistance, and processability of a laminated steel sheet.

Representative examples of the polyamine resins include aliphatic amines, such as diethylenetriamine, triethylenetriamine, and triethylenepentamine, and alicyclic polyamines, such as isophoronediamine. In order to improve workability, reduce irritancy, and improve mechanical properties, aliphatic polyamines may be combined with an epoxy resin or acrylonitrile or may be reacted with formaldehyde and phenol. Examples of aromatic polyamines include m-phenylenediamine, diaminodiphenyl sulfonic acid, and diaminodiphenylmethane. Examples of commercial products of the polyamine resins include EPICLON EXB-353 manufactured by DIC Corp. and Ancamine 2596 and Ancamine 2605 manufactured by Air Products Japan, Inc.

Polyamidoamine resins and polyamide resins are synthesized by dehydration condensation reactions between fatty acids and polyamines, for example. Examples of commercial products of polyamidoamine resins and polyamide resins include Polymide L-15-3 and Polymide L-45-3 manufactured by Sanyo Chemical Industries, Ltd. and Ancamide 2137, Sunmide 330, and Sunmide X-2000 manufactured by Air Products Japan, Inc.

Composition (Mass %) of Resin Layer (a1)

The resin component ratio of the resin layer (a1) preferably satisfies the following:

(i) the polyester resin: 50 to 89 mass %,
(ii) the phenolic resin: 10 to 45 mass %,
(iii) the metal alkoxide compound and/or the metal chelate compound: 0.01 to 10 mass %,
(iv) the epoxy resin: 0.5 to 20 mass %, and
(v) at least one selected from the group consisting of polyamine resins, polyamidoamine resins, and polyamide resins: 0.1 to 10 mass %.

The (i) polyester resin content of less than 50 mass % may result in poor processability. The (i) polyester resin content of more than 89 mass % may result in insufficient curing and low retort resistance. The (i) polyester resin content more preferably ranges from 55 to 85 mass %.

The (ii) phenolic resin content of less than 10 mass % may result in insufficient curing and low retort resistance. The (ii) phenolic resin content of more than 45 mass % may result in poor processability. The (ii) phenolic resin content more preferably ranges from 20 to 40 mass %.

The (iii) metal alkoxide compound and/or metal chelate compound content of less than 0.01 mass % may result in no expected fast curing effect. The (iii) metal alkoxide compound and/or metal chelate compound content of more than 10 mass % may result in gelation in the preparation of a coating liquid as well as a rigid resin film and poor processability. The (iii) metal alkoxide compound and/or metal chelate compound content more preferably ranges from 0.1 to 7 mass %.

The (iv) epoxy resin content of less than 0.5 mass % may result in poor adhesion and consequently low corrosion resistance. The (iv) epoxy resin content of more than 20 mass % may result in low retort whitening resistance. The (iv) epoxy resin content more preferably ranges from 2 to 7 mass %.

When the percentage of the (v) at least one selected from the group consisting of polyamine resins, polyamidoamine resins, and polyamide resins is less than 0.1 mass %, this may result in insufficient curing and low retort resistance. When the percentage of the (v) at least one selected from the group consisting of polyamine resins, polyamidoamine resins, and polyamide resins is more than 10 mass %, this may result in poor processability. The percentage of the (v) at least one selected from the group consisting of polyamine resins, polyamidoamine resins, and polyamide resins more preferably ranges from 1 to 4 mass %.

Amount of Resin Layer (a1)

The amount of resin layer (a1) is preferably 0.1 g/m² or more and 5.0 g/m² or less. Less than 0.1 g/m² of the resin layer (a1) may result in nonuniform coating of the metal sheet surface and an uneven thickness. More than 5.0 g/m² of the resin layer (a1) may result in an insufficient cohesive force of the resin and a low strength of the resin layer. In the manufacturing and processing of cans, this results in cohesive failure of the resin layer and detachment of the film, and from the point of detachment the can body starts to break.

Thus, the amount of resin layer (a1) is preferably 0.1 g/m² or more and 5.0 g/m² or less, more preferably 0.1 g/m² or more and 3.0 g/m² or less, still more preferably 0.5 g/m² or more and 2.5 g/m² or less.

Colorant

The addition of a colorant, such as a dye or pigment, to the resin layer (a1) can conceal the underlying metal sheet and produce various color tones characteristic of the resin. For example, the addition of carbon black as a black pigment can conceal the metallic color of the underlayer and impart a sense of high quality characteristic of black to the food can.

The carbon black may have a particle size in the range of 5 to 50 nm, preferably 5 to 30 nm in terms of dispersibility in the polyester resin and color developability.

Like black pigments, the addition of a white pigment can conceal the metallic luster of the underlayer, improve the sharpness of the printed surface, and give a good appearance. The pigment to be added should provide a good design after the formation of containers. To this end, inorganic pigments, such as titanium dioxide, may be used. Because of their high tinting strength and extensibility, inorganic pigments can provide a good design even after the formation of containers.

When brilliant colors are desired on the container surface, yellow organic pigments are suitably used. Because of their transparency, high tinting strength, and extensibility, yellow organic pigments can give the appearance of brilliant colors even after the formation of containers. An organic pigment that can be used in the present invention may be at least one of Color Index (abbreviation: C.I.) Pigment Yellows 12, 13, 14, 16, 17, 55, 81, 83, 139, 180, 181, 183, 191, and 214. In particular, C.I. Pigment Yellows 180 and 214 are preferably used in terms of color tone (brilliant color) sharpness and resistance to hot water discoloration.

Furthermore, examples of red pigments include C.I. Pigment Reds 101, 177, 179, 187, 220, and 254. Examples of blue pigments include C.I. Pigment Blues 15, 15:1, 15:2, and 15:3. Examples of violet pigments include C.I. Pigment Violet 19. Examples of orange pigments include C.I. Pigment Orange 64. Examples of green pigments include C.I. Pigment Green 7.

The blend ratio of each of these colorants preferably ranges from 0.1 to 70 mass % of the total solids of the resin layer constituting the resin layer (a1).

Curing Catalyst

In addition to the components (i) to (v) and the colorant, the resin layer (a1) may further contain a curing catalyst for promoting cross-linking. Examples of the curing catalyst include inorganic acids, such as phosphoric acid, organic acids, such as dodecylbenzenesulfonic acid and toluenesulfonic acid, and amine-blocked compounds thereof. The blend ratio of the curing catalyst preferably ranges from 0.01 to 5 mass % of the total solids of the resin layer constituting the resin layer (a1).

The resin layer (a1) may further contain a conventionally known lubricant, antifoaming agent, leveling agent, pigment, and anti-blocking agent, such as silica. Furthermore, another curing agent, such as melamine resin, benzoguanamine resin, or isocyanate resin, may also be used as a curing aid, depending on the film drying conditions and lamination conditions.

The resin layer (polyester film) (a2) on the resin layer (a1) will be described below.

The resin coating layer (A) preferably contains the resin layer (a2) as a top layer on the resin layer (a1). The resin layer (a2) is mainly composed of a polyester resin. More preferably, the resin layer (a2) is a polyester film (a2).

Composition of Polyester Film (a2)

In order to improve taste after retort treatment and reduce the generation of abrasion powder in the can manufacturing process, it is preferable that the polyester film used in the present invention be mainly composed of ethylene terephthalate and/or ethylene naphthalate. In the polyester mainly composed of ethylene terephthalate and/or ethylene naphthalate, ethylene terephthalate and/or ethylene naphthalate constitutes 85 mass % or more of the polyester. More preferably, ethylene terephthalate and/or ethylene naphthalate constitutes 90 mass % or more of the polyester because this allows a drink to maintain its taste in the metal can for a long time.

Another dicarboxylic acid component or glycol component may be copolymerized without spoiling the taste. Examples of such a dicarboxylic acid component include aromatic dicarboxylic acids, such as diphenylcarboxylic acid, sodium 5-sulfoisophthalate, and phthalic acid, aliphatic dicarboxylic acids, such as oxalic acid, succinic acid, adipic acid, sebacic acid, dimer acids, maleic acid, and fumaric acid, alicyclic dicarboxylic acids, such as cyclohexanedicarboxylic acid, and oxycarboxylic acids, such as p-oxybenzoic acid.

Examples of such a glycol component include aliphatic glycols, such as ethylene glycol, propanediol, butanediol, pentanediol, hexanediol, and neopentyl glycol, alicyclic glycols, such as cyclohexanedimethanol, aromatic glycols, such as bisphenol A and bisphenol S, diethylene glycol, and poly(ethylene glycol). Since an aromatic glycol bisphenol A may be an endocrine disruptor, it is desirable not to use bisphenol A as the glycol component. These dicarboxylic acid components and glycol components may be used in combination.

A polyfunctional compound, such as trimellitic acid, trimesic acid, or trimethylolpropane, may be copolymerized without losing the advantages of the present invention.

Particles

The polyester film used in the present invention may contain inorganic particles and/or organic particles. The composition of the particles in the polyester film used in the present invention is not limited to and may be organic or inorganic. The particles preferably have a volume average particle size in the range of 0.005 to 5.0 µm, particularly 0.01 to 3.0 µm, in terms of the projection shape, abrasion resistance, processability, and taste in the form of a film. The relative standard deviation defined by the following formula is preferably 0.5 or less, more preferably 0.3 or less, in terms of abrasion resistance.

$$\sigma = \left( \sum_{i=1}^{n} (Di - D)^2 / n \right)^{1/2} / D \quad \text{[Mathematical formula 1]}$$

$$D = \sum_{i=1}^{n} Di/n$$

wherein
σ: relative standard deviation,
D: number average particle size (µm),
Di: particle size (µm), and
n: number of particles (-).

The particles preferably have a major axis/minor axis ratio in the range of 1.0 to 1.2. The particles preferably have a Mohs hardness of less than 7 in terms of projection hardness and abrasion resistance.

In order to sufficiently produce these effects, the particles preferably constitute 0.005 to 10 mass % of the polyester film.

More specifically, examples of the inorganic particles include wet and dry silica, colloidal silica, aluminum silicate, titanium oxide, calcium carbonate, calcium phosphate, barium sulfate, alumina, mica, kaolin, and clay. In particular, the inorganic particles preferably have a surface functional group that reacts with a polyester to form a carboxylic acid metal salt. More specifically, the inorganic particles preferably have $10^{-5}$ mol or more, more preferably $2 \times 10^{-5}$ mol or more, of a functional group per 1 g of particles in terms of the affinity for polyesters and abrasion resistance.

The organic particles may be any organic polymer particles, provided that at least part of the organic particles are insoluble in the polyester. Examples of the material of such particles include polyimide, polyamideimide, poly(methyl methacrylate), formaldehyde resin, phenolic resin, cross-linked polystyrene, and silicone resin. Vinyl cross-linked polymer particles are particularly preferred because of their high heat resistance and uniform particle size distribution.

Such inorganic particles and organic polymer particles may be used alone and are preferably used in combination. A combination of particles having a difference in physical properties, such as particle size distribution and particle strength, can provide a more functional polyester resin.

Other particles, for example, various amorphous particles of an external addition type and particles of an internal precipitation type, or various surface-treating agents may be used without losing the advantages of the present invention. The polyester film is preferably a biaxially stretched polyester film in terms of heat resistance and taste. The biaxial stretching method may be simultaneous biaxial stretching or sequential biaxial stretching. In order to improve lamination and formability, the stretching conditions and heat-treatment conditions are determined so that the film has a refractive index of 1.50 or more in the thickness direction. Furthermore, when the refractive index in the thickness direction is 1.51 or more, particularly 1.52 or more, the plane orientation coefficient can be controlled in a specific range in order to achieve both high formability and impact resistance even in the presence of variations during lamination.

Furthermore, a carbonyl moiety of the biaxially stretched polyester film preferably has a relaxation time of 270 msec or more, more preferably 280 msec or more, still more preferably 300 msec or more, as measured by the structural analysis using high-resolution solid-state NMR in terms of the processability and impact resistance of a neck after thermal history in the range of approximately 200° C. to 230° C. after drawing in the can manufacturing process. Other particles, for example, various amorphous particles of an external addition type and particles of an internal precipitation type, or various surface-treating agents may be used without losing the advantages of the present invention.

Thickness of Polyester Film (a2)

The polyester film used in the present invention preferably has a thickness in the range of 5 to 100 µm. When the polyester film has a thickness of less than 5 µm, this results in insufficient coverage, low impact resistance, and poor formability. When the polyester film has a thickness of more than 100 µm, this results in not only no improvement in the above-mentioned characteristics but also an increase in thermal energy required for heat sealing on the metal surface, which reduces economic viability. Thus, the polyester film more preferably has a thickness in the range of 8 to 50 µm, still more preferably 10 to 25 µm.

A method for manufacturing a resin-coated metal sheet for containers according to embodiments of the present invention will be described below.

Method for Forming Resin Layer (a1) Mainly Composed of Polyester

A method for forming a polyester resin layer (a1) on the polyester film (a2) will be described below as an example.

The main component polyester resin is dissolved in an organic solvent, and the additive components and optional additive components of the resin layer (a1) specified in the present invention are dissolved or dispersed in the organic solvent to prepare a coating liquid. The coating liquid is applied to the surface of the polyester film (a2) during or after the formation of the polyester film (a2) and is dried to form the resin layer (a1).

Examples of the organic solvent for dissolving the polyester resin include aromatic hydrocarbon solvents, such as toluene and xylene, ketone solvents, such as methyl ethyl ketone and cyclohexanone, and ester solvents, such as ethyl acetate and ethylene glycol monoethyl ether acetate. These organic solvents may be used alone or in combination.

The coating liquid may further contain a conventionally known lubricant, antifoaming agent, leveling agent, pigment, and anti-blocking agent, such as silica. Furthermore, another curing agent, such as melamine resin, benzoguanamine resin, or isocyanate resin, may also be used as a curing aid, depending on the film drying conditions and lamination conditions.

Additive agents, such as a cross-linker, a curing catalyst, a colorant carbon black, and an azo pigment, specified in the present invention may be dispersed in the organic solvent. A dispersant is preferably used to uniformly disperse the additive agents.

The coating liquid may be applied to the polyester film using known coating means, such as with a roll coater, with a die coater, by gravure coating, by gravure-offset coating, or by spray coating. Among others, gravure roll coating is most suitable. The drying conditions after the application of the coating liquid are preferably 80° C. to 170° C. for 1 to 30 seconds, particularly 100° C. to 130° C. for 5 to 30 seconds. The amount of resin layer (a1) after drying preferably ranges from 0.1 to 5.0 g/m$^2$. The amount of resin layer (a1) in the range of 0.1 to 5.0 g/m$^2$ results in satisfactory continuous uniform coating performance, no design problem, high retort resistance, good adhesion, and high blocking resistance in film winding. When the amount of resin layer (a1) is less than 0.1 g/m$^2$, there may be some difficulties in the continuity of the film, physical properties, and ease of design. Furthermore, this may result in poor barrier to water vapor in retort sterilization treatment, accumulation of water at the resin layer (a1)/polyester film (a2) interface, and retort whitening. When the amount of resin layer (a1) is more than 5.0 g/m$^2$, this may result in significantly poor workability due to slow solvent evaporation after coating and significantly low blocking resistance in film winding due to residual solvent problems. The suitable amount of resin layer (a1) ranges from 0.5 to 2.5 g/m$^2$.

Method for Laminating Polyester Film (a2) on Metal Sheet After Resin Layer (a1) Coating The polyester film (a2) coated with the resin layer (a1) is laminated on a metal sheet such that the resin layer (a1) is in contact with the metal sheet. For example, the metal sheet is heated to a temperature above the melting point of the film, and then the polyester film (a2) coated with the resin layer (a1) is brought into contact with the metal sheet with a pressure roller (hereinafter referred to as a laminating roller) and is heat-sealed. In this case, as described above, it is necessary to bring the polyester film surface coated with the resin layer (a1) into contact with the metal sheet with the laminating roller and heat seal the polyester film.

The lamination conditions are appropriately determined in order to form a resin layer specified in the present invention. For example, the initial lamination temperature is equal to or higher than the melting point of the film, and the temperature history of the film during lamination is preferably such that the film contact time at a temperature equal to or higher than the melting point of the film ranges from 1 to 35 msec. Such lamination conditions require cooling during heat sealing as well as high speed lamination. The lamination pressure is not particularly limited and is preferably 9.8 to 294 Newton/cm$^2$ (1 to 30 kgf/cm$^2$) (hereinafter Newton is referred to as N) in terms of contact pressure. An excessively low lamination pressure may result in insufficient melting due to a short period of time even when the resin interface temperature reaches the melting point or higher, thus resulting in poor adhesion. Although a high lamination pressure is not disadvantageous with respect to the performance of a laminate metal sheet, this requires high-strength and uneconomically large facilities because of a great force applied to the laminating roller.

EXAMPLE 1

Embodiments of the present invention will be described below.

Manufacture of Metal Sheet

A chromium-coated steel sheet was used as a metal sheet. A steel sheet having a thickness of 0.18 mm and a width of 977 mm subjected to cold rolling, annealing, and skin pass rolling was subjected to degreasing treatment, pickling, and then chromium plating treatment to manufacture a chromium-coated steel sheet. The chromium plating treatment included chromium plating in a chromium plating bath containing $CrO_3$, $F^-$, and $SO_4^{2-}$, intermediate rinse, and electrolysis in a chemical conversion treatment liquid containing $CrO_3$ and F. The amount of deposited metallic chromium and the amount of deposited chromium hydroxide were set at 120 mg/m$^2$ and 15 mg/m$^2$ on a Cr basis, respectively, by altering the electrolysis conditions (such as electric current density and quantity of electricity).

Manufacture of Resin-Coating Film for can Inner Surface

A polyester resin produced by polymerization of the acid component and the glycol component listed in Table 2 at the ratio listed in Table 2 was blended with the particles listed in Table 2 to produce a resin composition. The resin composition was dried, melted, extruded, and solidified on a cooling drum through a routine procedure to form an unstretched film. The unstretched film was then biaxially stretched and heat-set to form a biaxially oriented polyester film (a2).

The polyester resin, the phenolic resin, the metal alkoxide compound and/or the metal chelate compound, the epoxy resin, the polyamine resin, the polyamidoamine resin, and the polyamide resin listed in Table 1 (Table 1-1 and Table 1-2. The same applies hereinafter.) at the ratio listed in Table 1 were then dissolved in a mixed solvent of toluene and methyl ethyl ketone to prepare a coating liquid.

The following is a synthesis example of a polyester resin (i-1) having a repeating unit derived from diphenolic acid. Acid components, that is, 50 parts by mass of terephthalic acid, 112 parts by mass of isophthalic acid, and 4.9 parts by mass of diphenolic acid, polyhydric alcohol components, that is, 50 parts by mass of 2-ethyl-2-butyl-1,3-butanediol, 99 parts by mass of 1,4-butanediol, and 48 parts by mass of 1,4-cyclohexanedimethanol, and 0.07 parts by mass of titanium tetrabutoxide in a 2-Liter flask were gradually heated to 220° C. over 4 hours to remove water for esterification. After removal of a predetermined amount of water, polymerization was performed while the pressure was reduced to 10 mmHg over 30 minutes. After the temperature was increased to 250° C., latter polymerization was performed at 1 mmHg or less for 50 minutes. After the polymerization under reduced pressure was stopped, the product was cooled to 220° C. in a nitrogen stream. 1.9 parts by mass of trimellitic anhydride was added to the product. The product was stirred at 220° C. for 30 minutes for carboxy group modification (post addition). The polyester resin (i-1) was thus produced. The polyester resin (i-1) had a number-average molecular weight of 22000, an acid value of 5 (mgKOH/g), and a glass transition temperature of 30° C. The polyester resin (i-1) was cooled to 60° C. or less and was dissolved in a mixed solvent of methyl ethyl ketone/toluene =50/50 to yield a polyester resin (i-1) solution, which had a non-volatile matter content of 40%.

The polyester resin (i-2) may be a commercially available polyester resin Vylon GK-250 (having a number-average molecular weight of 10000 and a glass transition temperature of 60° C. manufactured by Toyobo Co., Ltd.). The Vylon GK-250 was dissolved in a mixed solvent of methyl ethyl ketone/toluene=50/50 to produce a polyester resin (i-2) solution having a non-volatile matter content of 40%.

The polyester resin (i-3) may be a commercially available polyester resin Vylon GK-640 (having a number-average molecular weight of 18000 and a glass transition temperature of 79° C. manufactured by Toyobo Co., Ltd.). The Vylon GK-640 was dissolved in a mixed solvent of methyl ethyl ketone/toluene=50/50 to produce a polyester resin (i-3) solution having a non-volatile matter content of 40%.

The phenolic resin was a commercial product TD2495 (p-cresol phenolic resin, 50% n-butanol solution, manufactured by DIC Corp.), for example.

The metal chelate compound was a commercially available TC-200 (titanium octylene glycol chelate, Matsumoto Fine Chemical Co., Ltd.). The metal alkoxide compound was a commercially available ZA-65 (zirconium butoxide, Matsumoto Fine Chemical Co., Ltd.).

The epoxy resin was a commercially available Epiclon N-660 (cresol novolak epoxy resin, 50% methyl ethyl ketone solution, manufactured by DIC Corp.) or a commercially available YL6121H (biphenyl epoxy resin, manufactured by Mitsubishi Chemical Corp.).

The polyamine resin was a commercial product EPICLON EXB-353 (manufactured by DIC Corp.). The polyamidoamine resin was a commercial product SUNMIDE 328A (manufactured by Air Products Japan, Inc.). The polyamide resin was a commercial product Polymide L-15-3 (manufactured by Sanyo Chemical Industries, Ltd.).

The coating liquid was applied to one side of the biaxially oriented polyester film (a2) with a gravure roll coater and was dried to form the resin layer (a1) having a predetermined dry film thickness. The drying temperature ranged from 80° C. to 120° C.

TABLE 1-1

Can inner surface: composition of resin layer (a1)

| No. | Polyester resin (i-1) | | | Polyester resin (i-2) | | | Polyester resin (i-3) | | | Total amount of polyester resins (mass %) |
|---|---|---|---|---|---|---|---|---|---|---|
| | Tg (° C.) | Molecular weight | Amount (mass %) | Tg (° C.) | Molecular weight | Amount (mass %) | Tg (° C.) | Molecular weight | Amount (mass %) | |
| Example 1 | 30 | 22000 | 38 | 60 | 10000 | 16 | 79 | 18000 | 14 | 68 |
| Example 2 | 30 | 22000 | 40 | 60 | 10000 | 15 | 79 | 18000 | 15 | 70 |
| Example 3 | 30 | 22000 | 41 | 60 | 10000 | 12 | 79 | 18000 | 16 | 69 |
| Example 4 | 30 | 22000 | 57 | 60 | 10000 | 0 | 79 | 18000 | 0 | 57 |
| Example 5 | 20 | 13000 | 0 | 60 | 10000 | 0 | 79 | 18000 | 68 | 68 |
| Example 6 | 20 | 13000 | 45 | 60 | 10000 | 20 | 79 | 18000 | 15 | 80 |
| Example 7 | 20 | 13000 | 43 | 60 | 10000 | 17 | 79 | 18000 | 12 | 72 |
| Example 8 | 20 | 13000 | 38 | 60 | 10000 | 15 | 79 | 18000 | 12 | 65 |
| Example 9 | 20 | 13000 | 52 | 60 | 10000 | 13 | 79 | 18000 | 5 | 70 |
| Example 10 | 20 | 13000 | 25 | 60 | 10000 | 26 | 79 | 18000 | 20 | 71 |
| Example 11 | 30 | 22000 | 38 | 60 | 10000 | 15 | 79 | 18000 | 16 | 69 |
| Example 12 | 30 | 22000 | 35 | 60 | 10000 | 17 | 79 | 18000 | 19 | 71 |
| Example 13 | 30 | 22000 | 42 | 60 | 10000 | 10 | 79 | 18000 | 12 | 64 |
| Example 14 | 30 | 22000 | 38 | 60 | 10000 | 20 | 79 | 18000 | 12 | 70 |
| Example 15 | 30 | 22000 | 39 | 60 | 10000 | 11 | 79 | 18000 | 21 | 71 |
| Example 16 | 30 | 22000 | 45 | 60 | 10000 | 12 | 79 | 18000 | 12 | 69 |
| Example 17 | 30 | 22000 | 35 | 60 | 10000 | 20 | 79 | 18000 | 11 | 66 |
| Example 18 | 30 | 22000 | 35 | 60 | 10000 | 15 | 79 | 18000 | 12 | 62 |
| Example 19 | 30 | 22000 | 39 | 60 | 10000 | 14 | 79 | 18000 | 12 | 65 |
| Example 20 | 30 | 22000 | 40 | 60 | 10000 | 15 | 79 | 18000 | 15 | 70 |
| Comparative example 1 | 30 | 22000 | 38 | 60 | 10000 | 12 | 79 | 18000 | 12 | 62 |
| Comparative example 2 | 30 | 22000 | 60 | 60 | 10000 | 0 | 79 | 18000 | 0 | 60 |
| Comparative example 3 | 30 | 22000 | 0 | 60 | 10000 | 0 | 79 | 18000 | 0 | 0 |
| Comparative example 4 | 30 | 22000 | 60 | 60 | 10000 | 12 | 79 | 18000 | 23 | 95 |
| Comparative example 5 | 30 | 22000 | 0 | 60 | 10000 | 0 | 79 | 18000 | 60 | 60 |

TABLE 1-2

Can inner surface: composition of resin layer (a1)

| No. | Phenolic resin (ii) | | Metal alkoxide compound/ Metal chelate compound (iii) | | Epoxy resin (iv) | | Polyamine/ polyamidoamine/polyamide (v) | | Amount of adhered film (g/m²) |
|---|---|---|---|---|---|---|---|---|---|
| | Type | Amount (mass %) | Type | Amount (mass %) | Type | Amount (mass %) | Type | Amount (mass %) | |
| Example 1 | Cresol phenol | 21 | Titanium octylene glycol chelate | 3.0 | Cresol novolak epoxy resin | 5.0 | Modified polyamidoamine | 3.0 | 1.3 |
| Example 2 | Cresol phenol | 19 | Titanium octylene glycol chelate | 3.0 | Cresol novolak epoxy resin | 5.0 | Polyamine | 2.5 | 1.5 |
| Example 3 | Cresol phenol | 21 | Titanium octylene glycol chelate | 3.0 | Cresol novolak epoxy resin | 4.0 | Modified polyamidoamine | 3.0 | 0.8 |
| Example 4 | Cresol phenol | 32 | Titanium octylene glycol chelate | 3.0 | Cresol novolak epoxy resin | 5.0 | Modified polyamidoamine | 3.0 | 0.8 |

TABLE 1-2-continued

Can inner surface: composition of resin layer (a1)

| No. | Phenolic resin (ii) Type | Amount (mass %) | Metal alkoxide compound/ Metal chelate compound (iii) Type | Amount (mass %) | Epoxy resin (iv) Type | Amount (mass %) | Polyamine/ polyamidoamine/polyamide (v) Type | Amount (mass %) | Amount of adhered film (g/m²) |
|---|---|---|---|---|---|---|---|---|---|
| Example 5 | Cresol phenol | 22 | Titanium octylene glycol chelate | 3.0 | Cresol novolak epoxy resin | 4.5 | Modified polyamidoamine | 2.5 | 2.0 |
| Example 6 | Cresol phenol | 7 | Titanium octylene glycol chelate | 3.0 | Cresol novolak epoxy resin | 5.0 | Modified polyamidoamine | 5.0 | 1.7 |
| Example 7 | Cresol phenol | 18 | Zirconium butoxide | 3.0 | Cresol novolak epoxy resin | 5.0 | Modified polyamidoamine | 2.0 | 1.8 |
| Example 8 | Cresol phenol | 28 | Titanium octylene glycol chelate | 0.2 | Cresol novolak epoxy resin | 4.0 | Modified polyamidoamine | 2.5 | 2.0 |
| Example 9 | Cresol phenol | 19 | Titanium octylene glycol chelate | 3.0 | Cresol novolak epoxy resin | 5.0 | Modified polyamidoamine | 3.0 | 1.5 |
| Example 10 | Cresol phenol | 17 | Titanium octylene glycol chelate | 3.0 | Cresol novolak epoxy resin | 5.0 | Modified polyamidoamine | 4.0 | 0.9 |
| Example 11 | Cresol phenol | 21 | Titanium octylene glycol chelate | 2.5 | Cresol novolak epoxy resin | 5.0 | Polyamide | 2.5 | 1.5 |
| Example 12 | Cresol phenol | 18 | Titanium octylene glycol chelate | 3.0 | Cresol novolak epoxy resin | 5.0 | Modified polyamidoamine | 3.0 | 0.3 |
| Example 13 | Cresol phenol | 21 | Titanium octylene glycol chelate | 8.0 | Cresol novolak epoxy resin | 3.0 | Modified polyamidoamine | 4.0 | 1.5 |
| Example 14 | Cresol phenol | 20 | Titanium octylene glycol chelate | 3.0 | Cresol novolak epoxy resin | 5.0 | Modified polyamidoamine | 2.0 | 0.9 |
| Example 15 | Cresol phenol | 18 | Titanium butoxide | 3.0 | Cresol novolak epoxy resin | 5.0 | Modified polyamidoamine | 3.0 | 1.6 |
| Example 16 | Cresol phenol | 24 | Titanium octylene glycol chelate | 3.0 | Cresol novolak epoxy resin | 1.0 | Polyamine | 2.5 | 1.6 |
| Example 17 | Cresol phenol | 21 | Zirconium acetylacetone chelate | 3.0 | Cresol novolak epoxy resin | 5.0 | Modified polyamidoamine | 5.0 | 1.6 |
| Example 18 | Cresol phenol | 20 | Titanium octylene glycol chelate | 5.0 | Cresol novolak epoxy resin | 4.0 | Modified polyamidoamine | 9.0 | 1.6 |
| Example 19 | Cresol phenol | 25 | Titanium octylene glycol chelate | 5.0 | Cresol novolak epoxy resin | 4.0 | Modified polyamidoamine | 0.5 | 1.6 |
| Example 20 | Cresol phenol | 19 | Titanium octylene glycol chelate | 3.0 | Biphenyl epoxy resin | 5.0 | Polyamine | 2.5 | 1.5 |
| Comparative example 1 | Cresol phenol | 31 | Titanium octylene glycol chelate | 0.0 | Cresol novolak epoxy resin | 5.0 | Modified polyamidoamine | 2.0 | 1.5 |
| Comparative example 2 | Cresol phenol | 40 | Titanium octylene glycol chelate | 0.0 | Cresol novolak epoxy resin | 0.0 | Modified polyamidoamine | 0.0 | 1.5 |
| Comparative example 3 | Cresol phenol | 95 | Titanium octylene glycol chelate | 0.0 | Cresol novolak epoxy resin | 5.2 | Modified polyamidoamine | 0.0 | 1.6 |
| Comparative example 4 | Cresol phenol | 0 | Titanium octylene glycol chelate | 0.0 | Cresol novolak epoxy resin | 5.0 | Modified polyamidoamine | 0.0 | 1.6 |
| Comparative example 5 | Cresol phenol | 34 | Titanium octylene glycol chelate | 3.0 | Cresol novolak epoxy resin | 0.0 | Modified polyamidoamine | 3.0 | 1.6 |

TABLE 2

Can inner surface: Resin composition of polyester film (a2) (upper layer)

| No. | Resin type Acid component | Glycol component | Particles Type | Volume average particle size (μm) | Amount (mass %) | Relative standard deviation σ | Major axis/ minor axis | Mohs hardness | Thickness (μm) |
|---|---|---|---|---|---|---|---|---|---|
| Example 1 | Terephthalic acid (88) Isophthalic acid (12) | Ethylene glycol (100) | Aluminum silicate | 0.2 | 0.3 | 0.1 | 1.01 | 5 | 15.0 |
| Example 2 | Terephthalic acid (88) Isophthalic acid (12) | Ethylene glycol (100) | Aluminum silicate | 0.2 | 0.3 | 0.1 | 1.01 | 5 | 15.0 |
| Example 3 | Terephthalic acid (88) Isophthalic acid (12) | Ethylene glycol (100) | Silica | 0.2 | 0.3 | 0.1 | 1.01 | 6 | 15.0 |
| Example 4 | Terephthalic acid (88) Isophthalic acid (12) | Ethylene glycol (100) | Silica | 0.2 | 0.3 | 0.1 | 1.01 | 6 | 15.0 |
| Example 5 | Terephthalic acid (88) Isophthalic acid (12) | Ethylene glycol (100) | Silica | 0.2 | 0.3 | 0.1 | 1.01 | 6 | 15.0 |
| Example 6 | Terephthalic acid (100) | Ethylene glycol (100) | Silica | 0.2 | 0.3 | 0.1 | 1.01 | 6 | 15.0 |
| Example 7 | Terephthalic acid (100) | Ethylene glycol (100) | Aluminum silicate | 0.2 | 0.3 | 0.1 | 1.01 | 5 | 15.0 |

TABLE 2-continued

Can inner surface: Resin composition of polyester film (a2) (upper layer)

| No. | Resin type | | | Particles | | | | | Thickness (μm) |
|---|---|---|---|---|---|---|---|---|---|
| | Acid component | Glycol component | Type | Volume average particle size (μm) | Amount (mass %) | Relative standard deviation σ | Major axis/minor axis | Mohs hardness | |
| Example 8 | Terephthalic acid (100) | Ethylene glycol (100) | Aluminum silicate | 0.2 | 0.3 | 0.1 | 1.01 | 5 | 15.0 |
| Example 9 | Terephthalic acid (100) | Ethylene glycol (100) | Calcium carbonate | 0.6 | 0.3 | 0.25 | 1.33 | 5 | 15.0 |
| Example 10 | Terephthalic acid (100) | Ethylene glycol (100) | Calcium carbonate | 0.6 | 0.3 | 0.25 | 1.33 | 5 | 15.0 |
| Example 11 | Terephthalic acid (100) | Ethylene glycol (100) | Aluminum silicate | 0.2 | 0.3 | 0.1 | 1.01 | 5 | 15.0 |
| Example 12 | Terephthalic acid (88) Isophthalic acid (12) | Ethylene glycol (100) | Aluminum silicate | 0.2 | 0.3 | 0.1 | 1.01 | 5 | 15.0 |
| Example 13 | Terephthalic acid (100) | Ethylene glycol (100) | Aluminum silicate | 0.2 | 0.3 | 0.1 | 1.01 | 5 | 15.0 |
| Example 14 | Terephthalic acid (100) | Ethylene glycol (100) | Kaolin | 1.2 | 0.3 | 0.32 | 1.35 | 5 | 15.0 |
| Example 15 | Terephthalic acid (100) | Ethylene glycol (100) | Aluminum silicate | 0.2 | 0.3 | 0.1 | 1.01 | 5 | 15.0 |
| Example 16 | Terephthalic acid (100) | Ethylene glycol (100) | Aluminum silicate | 0.2 | 0.3 | 0.1 | 1.01 | 5 | 15.0 |
| Example 17 | Terephthalic acid (100) | Ethylene glycol (100) | Aluminum silicate | 0.2 | 0.3 | 0.1 | 1.01 | 5 | 15.0 |
| Example 18 | Terephthalic acid (101) | Ethylene glycol (101) | Aluminum silicate | 0.2 | 0.3 | 0.1 | 1.01 | 5 | 15.0 |
| Example 19 | Terephthalic acid (102) | Ethylene glycol (102) | Aluminum silicate | 0.2 | 0.3 | 0.1 | 1.01 | 5 | 15.0 |
| Example 20 | Terephthalic acid (102) | Ethylene glycol (102) | Aluminum silicate | 0.2 | 0.3 | 0.1 | 1.01 | 5 | 15.0 |
| Comparative example 1 | Terephthalic acid (88) Isophthalic acid (12) | Ethylene glycol (100) | Aluminum silicate | 0.2 | 0.3 | 0.1 | 1.01 | 5 | 15.0 |
| Comparative example 2 | Terephthalic acid (88) Isophthalic acid (12) | Ethylene glycol (100) | Aluminum silicate | 0.2 | 0.3 | 0.1 | 1.01 | 5 | 15.0 |
| Comparative example 3 | Terephthalic acid (100) | Ethylene glycol (100) | Silica | 0.2 | 0.3 | 0.1 | 1.01 | 6 | 15.0 |
| Comparative example 4 | Terephthalic acid (88) Isophthalic acid (12) | Ethylene glycol (100) | Aluminum silicate | 0.2 | 0.3 | 0.1 | 1.01 | 5 | 15.0 |
| Comparative example 5 | Terephthalic acid (100) | Ethylene glycol (100) | Silica | 0.2 | 0.3 | 0.1 | 1.01 | 6 | 15.0 |

Manufacture of Resin-Coating Film for can Outer Surface

A polyester resin produced by polymerization of the acid component and the glycol component listed in Table 4 at the ratio listed in Table 4 was blended with the particles listed in Table 4 to produce a resin composition. The resin composition was dried, melted, extruded, and solidified on a cooling drum through a routine procedure to form an unstretched film. The unstretched film was then biaxially stretched and heat-set to form a biaxially oriented polyester film (a2).

The polyester resin, the phenolic resin, the metal alkoxide compound and/or the metal chelate compound, the epoxy resin, the polyamine resin, the polyamidoamine resin, the polyamide resin, and the colorant listed in Table 3(Table 3-1 and Table 3-2. The same applies hereinafter.) at the ratio listed in Table 3 were then dissolved in a mixed solvent of toluene and methyl ethyl ketone to prepare a coating liquid.

The following is a synthesis example of a polyester resin (i-1) having a repeating unit derived from diphenolic acid. Acid components, that is, 50 parts by mass of terephthalic acid, 112 parts by mass of isophthalic acid, and 4.9 parts by mass of diphenolic acid, polyhydric alcohol components, that is, 50 parts by mass of 2-ethyl-2-butyl-1,3-butanediol, 99 parts by mass of 1,4-butanediol, and 48 parts by mass of 1,4-cyclohexanedimethanol, and 0.07 parts by mass of titanium tetrabutoxide in a 2-Liter flask were gradually heated to 220° C. over 4 hours to remove water for esterification. After removal of a predetermined amount of water, polymerization was performed while the pressure was reduced to 10 mmHg over 30 minutes. After the temperature was increased to 250° C., latter polymerization was performed at 1 mmHg or less for 50 minutes. After the polymerization under reduced pressure was stopped, the product was cooled to 220° C. in a nitrogen stream. 1.9 parts by mass of trimellitic anhydride was added to the product. The product was stirred at 220° C. for 30 minutes for carboxy group modification (post addition). The polyester resin (i-1) was thus produced. The polyester resin (i-1) had a number-average molecular weight of 22000, an acid value of 5 (mgKOH/g), and a glass transition temperature of 30° C. The polyester resin (i-1) was cooled to 60° C. or less and was dissolved in a mixed solvent of methyl ethyl ketone/toluene =50/50 to yield a polyester resin (i-1) solution, which had a non-volatile matter content of 40%.

The polyester resin (i-2) may be a commercially available polyester resin Vylon GK-250 (having a number-average molecular weight of 10000 and a glass transition temperature of 60° C. manufactured by Toyobo Co., Ltd.). The Vylon GK-250 was dissolved in a mixed solvent of methyl ethyl ketone/toluene=50/50 to produce a polyester resin (i-2) solution having a non-volatile matter content of 40%.

The polyester resin (i-3) may be a commercially available polyester resin Vylon GK-640 (having a number-average molecular weight of 18000 and a glass transition temperature of 79° C. manufactured by Toyobo Co., Ltd.). The Vylon GK-640 was dissolved in a mixed solvent of methyl ethyl ketone/toluene=50/50 to produce a polyester resin (i-3) solution having a non-volatile matter content of 40%.

The phenolic resin (ii) was a commercial product TD2495 (p-cresol phenolic resin, 50% n-butanol solution, manufactured by DIC Corp.), for example.

The metal chelate compound was a commercially available TC-200 (titanium octylene glycol chelate, Matsumoto Fine Chemical Co., Ltd.). The metal alkoxide compound was a commercially available ZA-65 (zirconium butoxide, Matsumoto Fine Chemical Co., Ltd.).

The epoxy resin was a commercially available Epiclon N-660 (cresol novolak epoxy resin, 50% methyl ethyl ketone solution, manufactured by DIC Corp.) or a commercially available YL6121H (biphenyl epoxy resin, manufactured by Mitsubishi Chemical Corp.).

The polyamine resin was a commercial product EPICLON EXB-353 (manufactured by DIC Corp.). The polyamidoamine resin was a commercial product SUNMIDE 328A (manufactured by Air Products Japan, Inc.). The polyamide resin was a commercial product Polymide L-15-3 (manufactured by Sanyo Chemical Industries, Ltd.).

The coating liquid was applied to one side of the biaxially oriented polyester film (a2) with a gravure roll coater and was dried to form the resin layer (a1) having a predetermined dry film thickness. The drying temperature ranged from 80° C. to 120° C.

TABLE 3-1

Can outer surface: composition of resin layer (a1)

| No. | Polyester resin (i-1) | | | Polyester resin (i-2) | | | Polyester resin (i-3) | | | Total amount of polyester resins (mass %) |
|---|---|---|---|---|---|---|---|---|---|---|
| | Tg (° C.) | Molecular weight | Amount (mass %) | Tg (° C.) | Molecular weight | Amount (mass %) | Tg (° C.) | Molecular weight | Amount (mass %) | |
| Example 1 | 30 | 22000 | 38 | 60 | 10000 | 16 | 79 | 18000 | 14 | 68 |
| Example 2 | 30 | 22000 | 40 | 60 | 10000 | 15 | 79 | 18000 | 15 | 70 |
| Example 3 | 30 | 22000 | 41 | 60 | 10000 | 12 | 79 | 18000 | 16 | 69 |
| Example 4 | 30 | 22000 | 57 | 60 | 10000 | 0 | 79 | 18000 | 0 | 57 |
| Example 5 | 20 | 13000 | 0 | 60 | 10000 | 0 | 79 | 18000 | 68 | 68 |
| Example 6 | 20 | 13000 | 45 | 60 | 10000 | 20 | 79 | 18000 | 15 | 80 |
| Example 7 | 20 | 13000 | 43 | 60 | 10000 | 17 | 79 | 18000 | 12 | 72 |
| Example 8 | 20 | 13000 | 38 | 60 | 10000 | 15 | 79 | 18000 | 12 | 65 |
| Example 9 | 20 | 13000 | 52 | 60 | 10000 | 13 | 79 | 18000 | 5 | 70 |
| Example 10 | 20 | 13000 | 25 | 60 | 10000 | 26 | 79 | 18000 | 20 | 71 |
| Example 11 | 30 | 22000 | 38 | 60 | 10000 | 15 | 79 | 18000 | 16 | 69 |
| Example 12 | 30 | 22000 | 35 | 60 | 10000 | 17 | 79 | 18000 | 19 | 71 |
| Example 13 | 30 | 22000 | 42 | 60 | 10000 | 10 | 79 | 18000 | 12 | 64 |
| Example 14 | 30 | 22000 | 38 | 60 | 10000 | 20 | 79 | 18000 | 12 | 70 |
| Example 15 | 30 | 22000 | 39 | 60 | 10000 | 11 | 79 | 18000 | 21 | 71 |
| Example 16 | 30 | 22000 | 45 | 60 | 10000 | 12 | 79 | 18000 | 12 | 69 |
| Example 17 | 30 | 22000 | 35 | 60 | 10000 | 20 | 79 | 18000 | 11 | 66 |
| Example 18 | 30 | 22000 | 35 | 60 | 10000 | 15 | 79 | 18000 | 12 | 62 |
| Example 19 | 30 | 22000 | 39 | 60 | 10000 | 14 | 79 | 18000 | 12 | 65 |
| Example 20 | 30 | 22000 | 38 | 60 | 10000 | 20 | 79 | 18000 | 12 | 70 |
| Comparative example 1 | 30 | 22000 | 38 | 60 | 10000 | 12 | 79 | 18000 | 12 | 62 |
| Comparative example 2 | 30 | 22000 | 60 | 60 | 10000 | 0 | 79 | 18000 | 0 | 60 |
| Comparative example 3 | 30 | 22000 | 0 | 60 | 10000 | 0 | 79 | 18000 | 0 | 0 |
| Comparative example 4 | 30 | 22000 | 60 | 60 | 10000 | 12 | 79 | 18000 | 23 | 95 |
| Comparative example 5 | 30 | 22000 | 0 | 60 | 10000 | 0 | 79 | 18000 | 60 | 60 |

TABLE 3-2

Can outer surface: composition of resin layer (a1)

| No. | Phenolic resin (ii) | | Metal alkoxide compound/ Metal chelate compound (iii) | | Epoxy resin (iv) | | Polyamine/ polyamidoamine/ polyamide (v) | | Colorant | | Amount of adhered film (g/m²) |
|---|---|---|---|---|---|---|---|---|---|---|---|
| | Type | Amount (mass %) | Type | Amount (mass %) | Type | Amount (mass %) | Type | Amount (mass %) | Type | Amount (mass %) | |
| Example 1 | Cresol phenol | 20 | Titanium octylene glycol chelate | 3.0 | Cresol novolak epoxy resin | 5.0 | Modified polyamidoamine | 3.0 | Azo pigment 1* | 1.0 | 1.3 |
| Example 2 | Cresol phenol | 19 | Titanium octylene glycol chelate | 3.0 | Cresol novolak epoxy resin | 5.0 | Polyamine | 2.5 | — | 0.0 | 1.5 |
| Example 3 | Cresol phenol | 21 | Titanium octylene glycol chelate | 3.0 | Cresol novolak epoxy resin | 4.0 | Modified polyamidoamine | 3.0 | — | 0.0 | 0.8 |
| Example 4 | Cresol phenol | 32 | Titanium octylene glycol chelate | 3.0 | Cresol novolak epoxy resin | 5.0 | Modified polyamidoamine | 3.0 | — | 0.0 | 0.8 |
| Example 5 | Cresol phenol | 22 | Titanium octylene glycol chelate | 3.0 | Cresol novolak epoxy resin | 4.5 | Modified polyamidoamine | 2.5 | — | 0.0 | 2.0 |
| Example 6 | Cresol phenol | 7 | Titanium octylene glycol chelate | 3.0 | Cresol novolak epoxy resin | 5.0 | Modified polyamidoamine | 5.0 | — | 0.0 | 1.7 |
| Example 7 | Cresol phenol | 18 | Zirconium butoxide | 3.0 | Cresol novolak epoxy resin | 5.0 | Modified polyamidoamine | 2.0 | — | 0.0 | 1.8 |
| Example 8 | Cresol phenol | 27 | Titanium octylene glycol chelate | 0.2 | Cresol novolak epoxy resin | 4.0 | Modified polyamidoamine | 2.5 | Azo pigment 2* | 0.8 | 2.0 |

TABLE 3-2-continued

| | Can outer surface: composition of resin layer (a1) | | | | | | | | | Amount of adhered film (g/m²) |
|---|---|---|---|---|---|---|---|---|---|---|
| | Phenolic resin (ii) | | Metal alkoxide compound/ Metal chelate compound (iii) | | Epoxy resin (iv) | | Polyamine/ polyamidoamine/ polyamide (v) | | Colorant | | |
| No. | Type | Amount (mass %) | Type | Amount (mass %) | Type | Amount (mass %) | Type | Amount (mass %) | Type | Amount (mass %) | |
| Example 9 | Cresol phenol | 19 | Titanium octylene glycol chelate | 3.0 | Cresol novolak epoxy resin | 5.0 | Modified polyamido-amine | 3.0 | — | 0.0 | 1.5 |
| Example 10 | Cresol phenol | 17 | Titanium octylene glycol chelate | 3.0 | Cresol novolak epoxy resin | 5.0 | Modified polyamido-amine | 4.0 | — | 0.0 | 0.9 |
| Example 11 | Cresol phenol | 21 | Titanium octylene glycol chelate | 2.5 | Cresol novolak epoxy resin | 5.0 | Polyamide | 2.5 | — | 0.0 | 1.5 |
| Example 12 | Cresol phenol | 18 | Titanium octylene glycol chelate | 3.0 | Cresol novolak epoxy resin | 5.0 | Modified polyamido-amine | 3.0 | — | 0.0 | 0.3 |
| Example 13 | Cresol phenol | 21 | Titanium octylene glycol chelate | 8.0 | Cresol novolak epoxy resin | 3.0 | Modified polyamido-amine | 4.0 | — | 0.0 | 1.5 |
| Example 14 | Cresol phenol | 20 | Titanium octylene glycol chelate | 3.0 | Cresol novolak epoxy resin | 5.0 | Modified polyamido-amine | 2.0 | — | 0.0 | 0.9 |
| Example 15 | Cresol phenol | 18 | Titanium butoxide | 3.0 | Cresol novolak epoxy resin | 5.0 | Modified polyamido-amine | 3.0 | — | 0.0 | 1.6 |
| Example 16 | Cresol phenol | 24 | Titanium octylene glycol chelate | 3.0 | Cresol novolak epoxy resin | 1.0 | Polyamine | 2.5 | — | 0.0 | 1.6 |
| Example 17 | Cresol phenol | 21 | Zirconium acetylacetone chelate | 3.0 | Cresol novolak epoxy resin | 5.0 | Modified polyamido-amine | 5.0 | — | 0.0 | 1.6 |
| Example 18 | Cresol phenol | 20 | Titanium octylene glycol chelate | 5.0 | Cresol novolak epoxy resin | 4.0 | Modified polyamido-amine | 9.0 | — | 0.0 | 1.6 |
| Example 19 | Cresol phenol | 25 | Titanium octylene glycol chelate | 5.0 | Cresol novolak epoxy resin | 4.0 | Modified polyamido-amine | 0.5 | — | 0.0 | 1.6 |
| Example 20 | Cresol phenol | 20 | Titanium octylene glycol chelate | 3.0 | Biphenyl epoxy resin | 5.0 | Modified polyamido-amine | 2.0 | — | 0.0 | 0.9 |
| Comparative example 1 | Cresol phenol | 31 | Titanium octylene glycol chelate | 0.0 | Cresol novolak epoxy resin | 5.0 | Modified polyamido-amine | 1.0 | Azo pigment 1* | 1.0 | 1.5 |
| Comparative example 2 | Cresol phenol | 40 | Titanium octylene glycol chelate | 0.0 | Cresol novolak epoxy resin | 0.0 | Modified polyamido-amine | 0.0 | — | 0.0 | 1.5 |
| Comparative example 3 | Cresol phenol | 94 | Titanium octylene glycol chelate | 0.0 | Cresol novolak epoxy resin | 5.2 | Modified polyamido-amine | 0.0 | Azo pigment 2* | 0.8 | 1.6 |
| Comparative example 4 | Cresol phenol | 0 | Titanium octylene glycol chelate | 0.0 | Cresol novolak epoxy resin | 5.0 | Modified polyamido-amine | 0.0 | — | 0.0 | 1.6 |
| Comparative example 5 | Cresol phenol | 34 | Titanium octylene glycol chelate | 3.0 | Cresol novolak epoxy resin | 0.0 | Modified polyamido-amine | 3.0 | — | 0.0 | 1.6 |

*Azo pigment 1: C.I. Pigment Yellow 180
*Azo pigment 2: C.I. Pigment Yellow 214

TABLE 4

Can outer surface: Resin composition of polyester film (a2) (upper layer)

| | Resin type | | | Particles | | | | | |
|---|---|---|---|---|---|---|---|---|---|
| No. | Acid component | Glycol component | Type | Volume average particle size (μm) | Amount (mass %) | Relative standard deviation σ | Major axis/ minor axis | Mohs hardness | Thickness (μm) |
| Example 1 | Terephthalic acid (88) Isophthalic acid (12) | Ethylene glycol (100) | Aluminum silicate | 0.2 | 0.3 | 0.1 | 1.01 | 5 | 12.0 |
| Example 2 | Terephthalic acid (88) Isophthalic acid (12) | Ethylene glycol (100) | Aluminum silicate | 0.2 | 0.3 | 0.1 | 1.01 | 5 | 12.0 |
| Example 3 | Terephthalic acid (88) Isophthalic acid (12) | Ethylene glycol (100) | Silica | 0.2 | 0.3 | 0.1 | 1.01 | 6 | 12.0 |
| Example 4 | Terephthalic acid (88) Isophthalic acid (12) | Ethylene glycol (100) | Silica | 0.2 | 0.3 | 0.1 | 1.01 | 6 | 12.0 |
| Example 5 | Terephthalic acid (88) Isophthalic acid (12) | Ethylene glycol (100) | Silica | 0.2 | 0.3 | 0.1 | 1.01 | 6 | 12.0 |
| Example 6 | Terephthalic acid (100) | Ethylene glycol (100) | Silica | 0.2 | 0.3 | 0.1 | 1.01 | 6 | 12.0 |
| Example 7 | Terephthalic acid (100) | Ethylene glycol (100) | Aluminum silicate | 0.2 | 0.3 | 0.1 | 1.01 | 5 | 12.0 |
| Example 8 | Terephthalic acid (100) | Ethylene glycol (100) | Aluminum silicate | 0.2 | 0.3 | 0.1 | 1.01 | 5 | 12.0 |
| Example 9 | Terephthalic acid (100) | Ethylene glycol (100) | Calcium carbonate | 0.6 | 0.3 | 0.25 | 1.33 | 5 | 12.0 |
| Example 10 | Terephthalic acid (100) | Ethylene glycol (100) | Calcium carbonate | 0.6 | 0.3 | 0.25 | 1.33 | 5 | 12.0 |
| Example 11 | Terephthalic acid (100) | Ethylene glycol (100) | Aluminum silicate | 0.2 | 0.3 | 0.1 | 1.01 | 5 | 12.0 |
| Example 12 | Terephthalic acid (88) Isophthalic acid (12) | Ethylene glycol (100) | Aluminum silicate | 0.2 | 0.3 | 0.1 | 1.01 | 5 | 12.0 |
| Example 13 | Terephthalic acid (100) | Ethylene glycol (100) | Aluminum silicate | 0.2 | 0.3 | 0.1 | 1.01 | 5 | 12.0 |
| Example 14 | Terephthalic acid (100) | Ethylene glycol (100) | Kaolin | 1.2 | 0.3 | 0.32 | 1.35 | 5 | 12.0 |
| Example 15 | Terephthalic acid (100) | Ethylene glycol (100) | Aluminum silicate | 0.2 | 0.3 | 0.1 | 1.01 | 5 | 12.0 |
| Example 16 | Terephthalic acid (100) | Ethylene glycol (100) | Aluminum silicate | 0.2 | 0.3 | 0.1 | 1.01 | 5 | 12.0 |
| Example 17 | Terephthalic acid (100) | Ethylene glycol (100) | Aluminum silicate | 0.2 | 0.3 | 0.1 | 1.01 | 5 | 12.0 |
| Example 18 | Terephthalic acid (100) | Ethylene glycol (100) | Aluminum silicate | 0.2 | 0.3 | 0.1 | 1.01 | 5 | 12.0 |
| Example 19 | Terephthalic acid (100) | Ethylene glycol (100) | Aluminum silicate | 0.2 | 0.3 | 0.1 | 1.01 | 5 | 12.0 |
| Example 20 | Terephthalic acid (100) | Ethylene glycol (100) | Aluminum silicate | 0.2 | 0.3 | 0.1 | 1.01 | 5 | 12.0 |
| Comparative example 1 | Terephthalic acid (88) Isophthalic acid (12) | Ethylene glycol (100) | Aluminum silicate | 0.2 | 0.3 | 0.1 | 1.01 | 5 | 12.0 |
| Comparative example 2 | Terephthalic acid (88) Isophthalic acid (12) | Ethylene glycol (100) | Aluminum silicate | 0.2 | 0.3 | 0.1 | 1.01 | 5 | 12.0 |
| Comparative example 3 | Terephthalic acid (100) | Ethylene glycol (100) | Silica | 0.2 | 0.3 | 0.1 | 1.01 | 6 | 12.0 |
| Comparative example 4 | Terephthalic acid (88) Isophthalic acid (12) | Ethylene glycol (100) | Aluminum silicate | 0.2 | 0.3 | 0.1 | 1.01 | 5 | 12.0 |
| Comparative example 5 | Terephthalic acid (100) | Ethylene glycol (100) | Silica | 0.2 | 0.3 | 0.1 | 1.01 | 6 | 12.0 |

Manufacture of Resin-Coated Metal Sheet for Containers

Using a metal strip laminator illustrated in FIG. 1, a chromium-coated steel sheet 1 manufactured as described above was heated with a metal strip heater 2. A resin coating layer (A) for the can inner surface was laminated (heat-sealed) on one surface of the chromium-coated steel sheet 1 with a laminating roller 3. A resin coating layer (A) for the can outer surface was laminated (heat-sealed) on the other surface of the chromium-coated steel sheet 1. After water cooling with a metal strip cooler 5, a polyester resin-coated metal sheet was completed. The laminating roller 3 was of an internal water cooling type and cooled the film by forced circulation of cooling water during lamination. In the lamination of the resin film on the metal sheet, the time for which the surface temperature of the film in contact with the metal sheet was equal to or higher than the melting point of the film ranged from 1 to 35 msec.

Figure 2:
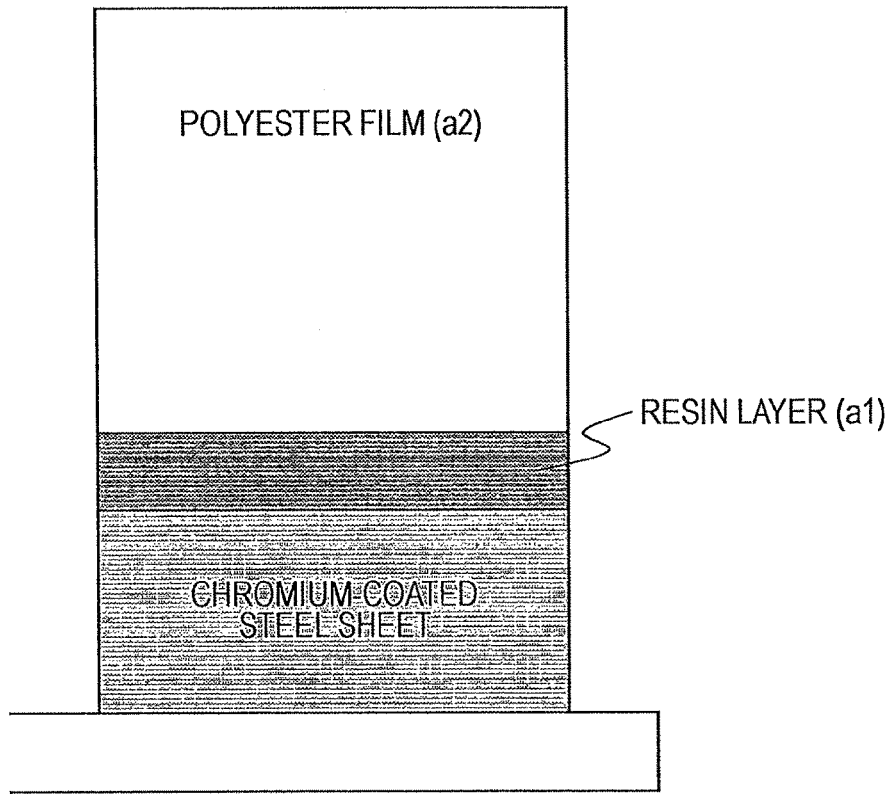
FIG. 2 is a schematic view of a cross-sectional structure of a film-laminated metal sheet. (Example 1)

FIG. 2 illustrates a cross-sectional structure of the film disposed on one side of the resin-coated metal sheet for containers thus manufactured (working example).

Evaluation of Resin-Coated Metal Sheet for Containers

The characteristics of the resin-coated metal sheet for containers thus manufactured were measured and evaluated by the following methods (1) to (7).

(1) Formability

After a wax was applied to a resin-coated metal sheet for containers, a disk having a diameter of 200 mm was punched out and was drawn at a drawing ratio of 2.00 to form a shallow drawn can. The drawn can was then redrawn at a drawing ratio of 2.50. The drawn can was then subjected to doming through a routine procedure, trimming, and neck-in flanging to form a draw and redraw can. The damage to the film in a neck-in portion of the draw and redraw can was visually inspected. The inner and outer surfaces of the can were observed.

(Evaluation Guide)

Figure 3:
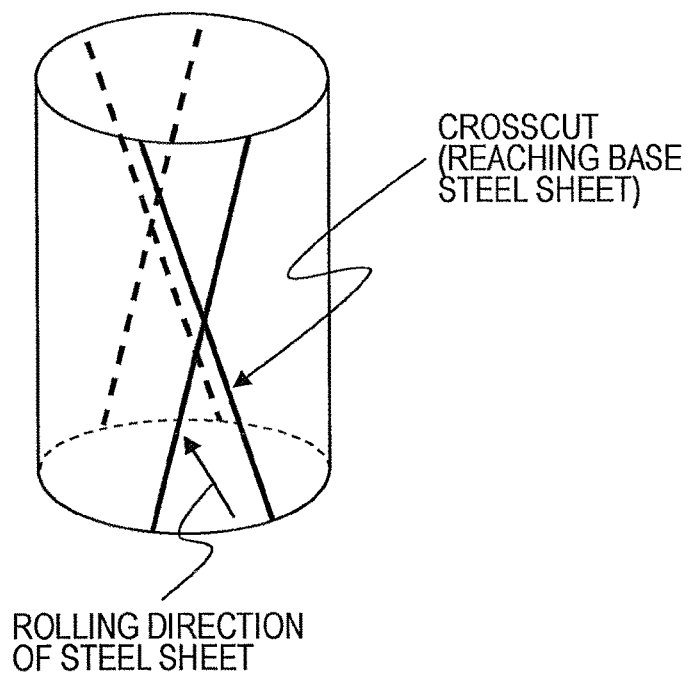
FIG. 3 is a schematic view of the position of a crosscut on a can body. (Example 1)

Excellent (double circle ⊚): No damage or whitening was observed on the film after forming Good (circle ○): No damage was observed on the film after forming, but whitening was partly observed Poor (cross X): A can body was broken, and forming was impossible (2) Retort Whitening Resistance The bottom (on the can outer surface) of cans considered to be formable (rated good or excellent) in the evaluation of (1) formability was tested. After a can was filled with tap water at normal temperature, a lid was wound up and closed. The can was placed in a steam retort sterilization furnace with the can bottom facing downward and was subjected to retort treatment at 125° C. for 90 minutes. After the treatment, the outer surface of the can bottom was visually inspected for a change in appearance.
(Evaluation Guide)
  Excellent (double circle ◎): No change in appearance
  Good (circle ○): Slight haze in appearance
  Poor (cross X): Cloudy appearance (whitening)
(3) Resistance to Hot Water Discoloration
  The bottom (on the can outer surface) of cans considered to be formable (rated good or excellent) in the evaluation of (1) formability was tested. After a can was filled with tap water at normal temperature, a lid was wound up and closed. The can was placed in a hot water retort sterilization furnace with the can bottom facing downward and was subjected to retort treatment at 125° C. for 90 minutes. After the treatment, the outer surface of the can bottom was visually inspected for a change in appearance.
(Evaluation Guide)
  Excellent (double circle ◎): No change in appearance
  Good (circle ○): A slight change in appearance (discoloration)
  Poor (cross X): A change in appearance (significant discoloration)
(4) Adhesiveness after Forming 1
  Cans considered to be formable (rated good or excellent) in the evaluation of (1) formability were tested.
  A peel test sample (having a width of 15 mm and a length of 120 mm) was cut out from the can body. Part of the film was removed from an end of a long side of the sample. The removed portion of the film was pulled in the direction opposite to the removing direction (at an angle of 180 degrees) with a tensile tester at a cross head speed of 30 mm/min in the peel test. The adhesion for a width of 15 mm was measured. The outer surface of the can body was observed.
(Evaluation Standard)
  Excellent (double circle ◎): at least 10.0 (N)/15 (mm)
  Good (circle ○): at least 5.0 (N)/15 (mm) and less than 10.0 (N)/15 (mm)
  Poor (cross X): less than 5.0 (N)/15 (mm)
(5) Adhesiveness after Forming 2
  Cans considered to be formable (rated good or excellent) in the evaluation of (1) formability were tested. After a can was filled with tap water, a lid was wound up and closed. Subsequently, retort sterilization treatment was performed at 130° C. for 90 minutes, and a peel test sample (having a width of 15 mm and a length of 120 mm) was cut out from the can body. Part of the film was removed from an end of a long side of the sample. The removed portion of the film was pulled in the direction opposite to the removing direction (at an angle of 180 degrees) with a tensile tester at a cross head speed of 30 mm/min in the peel test. The adhesion for a width of 15 mm was measured. The inner surface of the can body was observed.
(Evaluation Standard)
  Excellent (double circle ◎): at least 10.0 (N)/15 (mm)
  Good (circle ○): at least 5.0 (N)/15 (mm) and less than 10.0 (N)/15 (mm)
  Poor (cross X): less than 5.0 (N)/15 (mm)
(6) Evaluation of Crosscut Corrosion Resistance 1
  Cans considered to be formable (rated good or excellent) in the evaluation of (1) formability were tested. As illustrated in FIG. 3, two crosscuts reaching the base steel sheet were made on the outer surface of the can body. The can having the crosscuts was subjected to a salt spray test for 300 hours in accordance with JIS Z 2371, and the one-side maximum corrosion width from the crosscuts was measured.

Figure 4:
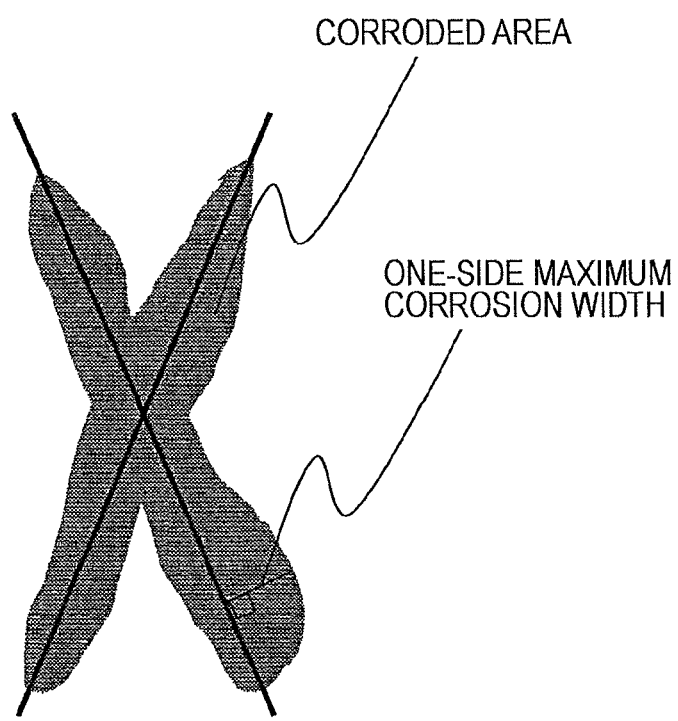
FIG. 4 is a schematic view of a method for measuring the maximum corrosion width from an artificial cut.

FIG. 4 illustrates the measurement method. The outer surface of the can body was observed.
(Evaluation Standard)
  Excellent (double circle ◎): one-side maximum corrosion width of less than 0.5 mm
  Good (circle ○): one-side maximum corrosion width of 0.5 mm or more and less than 1.0 mm
  Poor (cross X): one-side maximum corrosion width of 1.0 mm or more
(7) Evaluation of Crosscut Corrosion Resistance 2
  Cans considered to be formable (rated good or excellent) in the evaluation of (1) formability were tested. As illustrated in FIG. 3, two crosscuts reaching the base steel sheet were made on the inner surface of the can body. Subsequently, the can was filled with a liquid mixture of 1.5% NaCl+1.5% sodium citrate, and a lid was wound up and closed. After retort sterilization treatment was performed at 130° C. for 90 minutes, the can was placed in a thermostat at a temperature of 38° C. for 20 days. The can was then cut open, and the one-side maximum corrosion width from the crosscuts was measured. The measurement method was the same as in the (6) evaluation of crosscut corrosion resistance 1. The inner surface of the can body was observed.
(Evaluation Guide)
  Excellent (double circle ◎): one-side maximum corrosion width of less than 1.0 mm
  Good (circle ○): one-side maximum corrosion width of 1.0 mm or more and less than 3.0 mm
  Poor (cross X); one-side maximum corrosion width of 3.0 mm or more Tables 5 and 6 show the results.

TABLE 5

Evaluation results on performance of can inner surface

| No. | Formability | Adhesiveness after forming (2) | Crosscut corrosion resistance (2) | Sulfide stain resistance |
|---|---|---|---|---|
| Example 1 | ◎ | ◎ | ◎ | ◎ |
| Example 2 | ◎ | ◎ | ◎ | ◎ |
| Example 3 | ◎ | ◎ | ◎ | ○ |
| Example 4 | ◎ | ○ | ○ | ◎ |
| Example 5 | ○ | ○ | ○ | ◎ |
| Example 6 | ◎ | ◎ | ◎ | ◎ |
| Example 7 | ◎ | ◎ | ◎ | ◎ |
| Example 8 | ◎ | ○ | ○ | ◎ |
| Example 9 | ◎ | ◎ | ◎ | ◎ |
| Example 10 | ◎ | ◎ | ◎ | ◎ |
| Example 11 | ◎ | ◎ | ◎ | ◎ |
| Example 12 | ◎ | ○ | ○ | ◎ |
| Example 13 | ○ | ○ | ○ | ◎ |
| Example 14 | ◎ | ◎ | ◎ | ◎ |
| Example 15 | ◎ | ◎ | ◎ | ◎ |
| Example 16 | ◎ | ◎ | ◎ | ◎ |
| Example 17 | ◎ | ◎ | ◎ | ◎ |
| Example 18 | ○ | ○ | ○ | ◎ |
| Example 19 | ◎ | ◎ | ◎ | ◎ |
| Example 20 | ◎ | ○ | ◎ | ◎ |
| Comparative example 1 | ○ | X | X | X |
| Comparative example 2 | ○ | X | X | X |
| Comparative example 3 | X | — | — | — |
| Comparative example 4 | ○ | X | X | X |
| Comparative example 5 | X | — | — | — |

TABLE 6

Evaluation results on performance of can outer surface

| No. | Formability | Retort whitening resistance | Resistance to hot water discoloration | Adhesiveness after forming (1) | Crosscut corrosion resistance (1) |
|---|---|---|---|---|---|
| Example 1 | ⊚ | ⊚ | ⊚ | ⊚ | ⊚ |
| Example 2 | ⊚ | ⊚ | ⊚ | ⊚ | ⊚ |
| Example 3 | ⊚ | ⊚ | ⊚ | ⊚ | ⊚ |
| Example 4 | ⊚ | ⊚ | ○ | ⊚ | ⊚ |
| Example 5 | ○ | ⊚ | ⊚ | ○ | ○ |
| Example 6 | ⊚ | ○ | ○ | ⊚ | ⊚ |
| Example 7 | ⊚ | ○ | ○ | ⊚ | ○ |
| Example 8 | ⊚ | ○ | ○ | ○ | ○ |
| Example 9 | ⊚ | ○ | ○ | ⊚ | ⊚ |
| Example 10 | ⊚ | ○ | ○ | ⊚ | ⊚ |
| Example 11 | ⊚ | ⊚ | ⊚ | ⊚ | ○ |
| Example 12 | ⊚ | ○ | ⊚ | ○ | ○ |
| Example 13 | ○ | ⊚ | ⊚ | ○ | ○ |
| Example 14 | ⊚ | ⊚ | ⊚ | ⊚ | ⊚ |
| Example 15 | ⊚ | ○ | ○ | ⊚ | ⊚ |
| Example 16 | ⊚ | ⊚ | ⊚ | ⊚ | ⊚ |
| Example 17 | ⊚ | ○ | ○ | ⊚ | ⊚ |
| Example 18 | ○ | ⊚ | ⊚ | ○ | ○ |
| Example 19 | ⊚ | ○ | ○ | ⊚ | ⊚ |
| Example 20 | ⊚ | ○ | ○ | ○ | ⊚ |
| Comparative example 1 | ○ | X | X | X | X |
| Comparative example 2 | ○ | X | X | X | X |
| Comparative example 3 | X | — | — | — | — |
| Comparative example 4 | ○ | X | X | X | X |
| Comparative example 5 | X | — | — | — | — |

Tables 5 and 6 show that the working examples had satisfactory formability, retort whitening resistance, resistance to hot water discoloration, adhesiveness after forming, and crosscut corrosion resistance required for food can materials. In contrast, comparative examples outside the scope of the present invention were inferior in at least one of these characteristics to the working examples.

A resin-coated metal sheet according to the present invention can be used as a food can material for can bodies and lids of food cans in the worldwide market.

REFERENCE SIGNS LIST 1 metal sheet (chromium-coated steel sheet)
2 metal strip heater
3 laminating roller
4a, 4b film
5 metal strip cooler

The invention claimed is:

1. A resin-coated metal sheet for containers, comprising a metal sheet having on at least one surface thereof a resin layer (a1) in contact with and adhering to the metal sheet, wherein resin layer (a1) contains the following components (i) to (v):
   (i) a polyester resin constituting at least 50 mass % of layer (a1), wherein the polyester resin has a number-average molecular weight in the range of 3000 to 100000 and is at least one of the following (i-1) to (i-3):
     (i-1) a polyester resin having a glass transition temperature of 0° C. or more and less than 35° C.,
     (i-2) a polyester resin having a glass transition temperature of 35° C. or more and less than 65° C., and
     (i-3) a polyester resin having a glass transition temperature of 65° C. or more and less than 100° C.,
   (ii) a phenolic resin,
   (iii) a metal alkoxide compound and/or a chelated metal compound,
   (iv) an epoxy resin, and
   (v) at least one compound selected from the group consisting of polyamines, polyamidoamine resins, and polyamide resins.

2. The resin-coated metal sheet for containers according to claim 1, wherein the (iv) epoxy resin does not comprise units of bisphenol A.

3. The resin-coated metal sheet for containers according to claim 1, further comprising a polyester film (a2) disposed on the resin layer (a1).

4. The resin-coated metal sheet for containers according to claim 1, wherein the resin component ratio of the resin layer (a1) is as follows:
   (i) the polyester resin: 50 to 89 mass %,
   (ii) the phenolic resin: 10 to 45 mass %,
   (iii) the metal alkoxide compound and/or the chelated metal compound: 0.01 to 10 mass %,
   (iv) the epoxy resin: 0.5 to 20 mass %, and
   (v) the at least one compound selected from the group consisting of polyamines, polyamidoamine resins, and polyamide resins: 0.1 to 10 mass %.

5. The resin-coated metal sheet for containers according to claim 1, wherein the polyester resin ratio of the (i) polyester resin is as follows:
   the polyester resin having a glass transition temperature of 0° C. or more and less than 35° C.: 30 to 70 mass %,
   the polyester resin having a glass transition temperature of 35° C. or more and less than 65° C.: 10 to 35 mass %, and
   the polyester resin having a glass transition temperature of 65° C. or more and less than 100° C.: 10 to 35 mass %.

6. The resin-coated metal sheet for containers according to claim 1, wherein the (i) polyester resin is a polyester resin having diphenolic acid repeating units.

7. The resin-coated metal sheet for containers according to claim 1, wherein the (iii) metal alkoxide compound and/or chelated metal compound is a titanium alkoxide compound and/or a chelated titanium compound.

8. The resin-coated metal sheet for containers according to claim 3, wherein the polyester film (a2) is a biaxially stretched polyester film in which 85 mass % or more of the constitutional units of the polyester resin is an ethylene terephthalate unit and/or an ethylene naphthalate unit, and the biaxially stretched polyester film contains inorganic particles and/or organic particles.

* * * * *